United States Patent
Cardinal et al.

(10) Patent No.: US 9,978,010 B2
(45) Date of Patent: *May 22, 2018

(54) ORGANIC LIGHT EMITTING DIODE ("OLED") UNIVERSAL PLASTIC

(71) Applicant: Bank of America Corporation, Charlotte, NC (US)

(72) Inventors: Donald Joseph Cardinal, San Antonio, TX (US); Julie Kisselburg Johnson, Phoenix, AZ (US); James M. Heddleson, Charlotte, NC (US); Richard McKinnon, Garnet Valley, PA (US); Russell Kendall, Seattle, WA (US); Cameron Wadley, Waxhaw, NC (US); Willard H. Waldron, III, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/497,030

(22) Filed: Apr. 25, 2017

(65) Prior Publication Data
US 2017/0364788 A1 Dec. 21, 2017

Related U.S. Application Data

(63) Continuation of application No. 15/187,931, filed on Jun. 21, 2016, now Pat. No. 9,665,818.

(51) Int. Cl.
G06K 19/077 (2006.01)
G06K 19/07 (2006.01)

(52) U.S. Cl.
CPC ... *G06K 19/07705* (2013.01); *G06K 19/0702* (2013.01); *G06K 19/0723* (2013.01)

(58) Field of Classification Search
USPC .......... 235/492, 488; 705/14.17, 39
See application file for complete search history.

(56) References Cited

U.S. PATENT DOCUMENTS

| 3,703,864 A | 11/1972 | Bradford |
|---|---|---|
| 3,946,206 A | 3/1976 | Darjany |

(Continued)

FOREIGN PATENT DOCUMENTS

| DE | 102009028991 | 8/2009 |
|---|---|---|
| EP | 0827066 | 7/1997 |
| WO | WO2013131153 | 4/2012 |

OTHER PUBLICATIONS

Conor Gaffey, "World's Smallest Nano Chip will Double Processing Power of Smartphones," Jun. 9, 2015.

(Continued)

*Primary Examiner* — Allyson Trail
(74) *Attorney, Agent, or Firm* — Weiss & Arons LLP; Michael A. Springs, Esq.

(57) ABSTRACT

Aspects of the invention relate to a smart card that includes an OLED display. The smart card may store data associated with multiple purchasing instruments and utilize the OLED display to present sensitive data associated with a user selected purchasing instrument. In response to the selection, the smart card may transmit sensitive data associated with the selected purchasing instrument. The OLED display may allow the smart card to include a customizable face. The OLED display may present video, colors or any suitable text. For example, the OLED display may present a user's credit limit, rewards or spend categories. Such smart cards may be easily re-branded as a result of the smart card not being permanently tied to an embossed number. New sensitive data may be pushed to the smart card and thereby allow it to be used immediately based on the new sensitive data.

20 Claims, 16 Drawing Sheets

(56) References Cited

U.S. PATENT DOCUMENTS

| | | | |
|---|---|---|---|
| 4,968,873 A | 11/1990 | Dethloff et al. | |
| 5,313,051 A | 5/1994 | Brigida et al. | |
| 5,693,956 A | 12/1997 | Shi et al. | |
| 5,734,154 A | 3/1998 | Jachimowicz et al. | |
| 5,770,849 A | 6/1998 | Novis et al. | |
| 6,015,092 A | 1/2000 | Postlewaite et al. | |
| 6,173,899 B1 | 1/2001 | Rozin | |
| 6,394,343 B1 | 5/2002 | Berg et al. | |
| 6,724,103 B2 | 4/2004 | Parrault | |
| 7,025,277 B2 | 4/2006 | Forrest et al. | |
| 7,270,276 B2 | 9/2007 | Vayssiere | |
| 7,360,682 B2 | 4/2008 | Shane et al. | |
| 7,360,691 B2 | 4/2008 | Takayama | |
| 7,523,856 B2 | 4/2009 | Block et al. | |
| 7,588,183 B2 | 9/2009 | Shane et al. | |
| 7,791,559 B2 | 9/2010 | Piasecki | |
| 7,814,016 B2 | 10/2010 | Pranger | |
| 7,856,116 B2 | 12/2010 | Rodriguez et al. | |
| 7,940,159 B2 | 5/2011 | Clemens et al. | |
| 7,992,789 B2 | 8/2011 | Borracci | |
| 8,237,068 B2 | 8/2012 | Szaikowski | |
| 8,276,823 B2 | 10/2012 | Chen | |
| 8,317,094 B2 | 11/2012 | Lehman | |
| 8,378,932 B2 | 2/2013 | Fein et al. | |
| 8,392,965 B2 | 3/2013 | Carter et al. | |
| 8,413,893 B2 | 4/2013 | Kim | |
| 8,471,782 B2 | 6/2013 | Muklashy et al. | |
| 8,479,981 B2 | 7/2013 | Carmichael et al. | |
| 8,399,889 B2 | 9/2013 | Wu et al. | |
| 8,523,059 B1 | 9/2013 | Mullen et al. | |
| 8,540,151 B1 | 9/2013 | Snyder et al. | |
| 8,678,293 B2 | 3/2014 | Chen | |
| 8,756,680 B2 | 6/2014 | Shashidhar | |
| 8,810,816 B2 | 8/2014 | Fischer et al. | |
| 8,820,638 B1 | 9/2014 | Cotter et al. | |
| 2003/0145205 A1 | 7/2003 | Sarcanin | |
| 2003/0208405 A1 | 11/2003 | Putman et al. | |
| 2005/0102499 A1 | 5/2005 | Kosuga et al. | |
| 2005/0134461 A1 | 6/2005 | Gelbman et al. | |
| 2005/0173518 A1 | 8/2005 | Takayama | |
| 2006/0016884 A1 | 1/2006 | Block et al. | |
| 2006/0091223 A1 | 5/2006 | Zellner et al. | |
| 2006/0131393 A1 | 6/2006 | Cok et al. | |
| 2006/0261174 A1 | 11/2006 | Zellner et al. | |
| 2007/0273507 A1 | 11/2007 | Burchell et al. | |
| 2007/0279315 A1 | 12/2007 | Laves et al. | |
| 2008/0035736 A1 | 2/2008 | Tompkin et al. | |
| 2008/0158150 A1 | 7/2008 | Rossman et al. | |
| 2009/0039154 A1 | 2/2009 | Williams et al. | |
| 2010/0084476 A1 | 4/2010 | Zellner et al. | |
| 2010/0260388 A1 | 10/2010 | Garrett et al. | |
| 2010/0302206 A1 | 12/2010 | Yu et al. | |
| 2011/0060640 A1 | 3/2011 | Thompson et al. | |
| 2011/0140841 A1 | 6/2011 | Bona et al. | |
| 2011/0178928 A1 | 7/2011 | Carmichael et al. | |
| 2011/0241996 A1 | 10/2011 | Vesely | |
| 2012/0280924 A1 | 11/2012 | Kummer et al. | |
| 2013/0162594 A1 | 6/2013 | Paulsen et al. | |
| 2013/0221112 A1 | 8/2013 | Lai et al. | |
| 2013/0232082 A1 | 9/2013 | Krawczewicz et al. | |
| 2014/0007002 A1 | 1/2014 | Chang et al. | |
| 2014/0081729 A1 | 3/2014 | Ocher | |
| 2014/0093144 A1 | 4/2014 | Feekes | |
| 2014/0114861 A1 | 4/2014 | Mages et al. | |
| 2014/0172700 A1 | 6/2014 | Teuwen et al. | |
| 2014/0226275 A1 | 8/2014 | Ko et al. | |
| 2014/0291406 A1 | 10/2014 | Ko | |
| 2014/0337957 A1 | 11/2014 | Feekes | |
| 2014/0353384 A1 | 12/2014 | Hoegerl et al. | |
| 2015/0077646 A1 | 3/2015 | Chen et al. | |
| 2015/0262052 A1 | 9/2015 | Pahuja | |
| 2016/0004945 A1 | 1/2016 | Wade | |
| 2016/0054479 A1 | 2/2016 | Ho et al. | |
| 2016/0085325 A1 | 3/2016 | Lee et al. | |
| 2016/0171461 A1 | 6/2016 | Hoover et al. | |
| 2016/0210453 A1 | 7/2016 | Seo et al. | |
| 2016/0224528 A1 | 8/2016 | Trevarthen et al. | |

OTHER PUBLICATIONS http://www.us.schott.com/innovation/ultrathinglass/, Retrieved on Sep. 14, 2016.

"Schott's Reliable and Strong Ultra-Thin Glass Features in Fingerprint Sensors in stew Smartphones," Retrieved on Sep. 14, 2016.

Ron Martens, "The OLED Handbook, A Guide to OLED Technology, Industry & Market," 2015 Edition.

Bryce Kellogg, Vamsi Tana, Shyamnath Gollakota and Joshua R. Smith, "Passive Wi-Fi: Bringing Low Power to Wi-Fi Transmissions," Retrieved on May 11, 2016.

Ron Mertens, SecureCard—A New Secure Credit Card Technology, Utilizing an OLED Display, Nov. 21, 2006, Metalgrass Software.

John Wehr, "Card Size Specifications: When Does Card Size Matter?" Jan. 1, 2002.

Zachary Shahan, "Ultra-Thin-Solar-Cell Company Unstealths, Aims to Cut Cost of Solar Cells in Half!" Mar. 14, 2012, Sustainable Enterprises Media, Inc.

"ISO Magnetic Stripe Card Standards," Retrieved on Jul. 18, 2016.

"Coin Vs. Plastic: Which Credit Card Consolidation Tool is the Best?" Retrieved on Apr. 7, 2016, PayProTec.

"Tiny Batteries Could Revolutionize Green Energy," Retrieved on Apr. 5, 2016, National Geographic Society.

"Yubikey 4 & Yubikey 4 Nano," Retrieved on Apr. 7, 2016, Yubico.

"Magnetic Stripe Card Standards," Retrieved on Apr. 20, 2016, MagTek Inc., Seal Beach, California.

"A Power-Harvesting Pad-Less mm-sized 24/60GHz Passive Radio With On-Chip Antennas," Retrieved on Apr. 19, 2016, IEEE.

"Magnetic Stripe Card Recommendations," Retrieved on Apr. 20, 2016.

"Plastic Card Manufacturing including Magnetic Stripe Tapelaying," Retrieved on Apr. 20, 2016.

Paul Buckley, "Flexible OLED Displays Target Volume Production in 2015," Feb. 5, 2015.

"MAX2837—2.3GHz to 2.7GHz Wireless Broadband RF Transceiver," Retrieved on May 30, 2016, Maxim Integrated.

"Ultrathin Rechargeable Lithium Polymer Batteries from PowerStream," Apr. 5, 2016, Lund Instrument Engineering, Inc.

Tom Abate, "Stanford Engineers Aim to Connect the World with Ant-Sized Radios," Sep. 9, 2014, Stanford University, Stanford California.

http://www.schott.com/advanced_optics/english/syn/advanced_optics/products/wafers-and-thin-glass/glass-wafer-and-substrates/ultra-thin-glass/index.html, Retrieved on May 30, 2016.

Jennifer Langston, "UW Engineers Achieve Wi-Fi at 10,000 Times Lower Power," Feb. 23, 2016.

Ron Mertens, "New All-in-One Credit Card Concept," Oct. 29, 2009, Metalgrass Software.

"Wi-Fi," Apr. 12, 2016, Wikimedia Foundation, Inc.

"Ant-Sized loT Radio," Retrieved on Jul. 18, 2016.

Nick Pino, "Samsung's Latest OLED Can be a Mirror, a Window, or a TV," Jun. 11, 2015, Future US, Inc., San Francisco, California.

"Pneumatic Tube," Mar. 11, 2016, Wikimedia Foundation, Inc.

"New Virtual Tellers," Retrieved on Jun. 6, 2016, Frontier Bank.

Dario Borghino, "High-Tech Light Shutter Could Help Turn Your Windows into LCD Displays," May 1, 2015, Gizmag.

L. Zhao et al. "Novel Method for Fabricating Flexible Active Matrix Organic Light Emitting Diode (AMOLED) Displays," Sep. 21, 2011, Hewlett-Packard Development Company, L.P.

Amar Toor, "LG Unveils Flexible Plastic E-paper Display, Aims for European Launch Next Month," Mar. 29, 2012.

Martyn Williams, "Samsung, LG Show Flexible OLED, E-Paper Screens," Nov. 10, 2010.

"Electronic Paper," Jun. 10, 2016, Wikimedia Foundation, Inc.

"E Ink," Jun. 8, 2016, Wikimedia Foundation, Inc.

"Ink Technology: Electrophoretic Ink, Explained," Retrieved on Jun. 20, 2016, E Ink Holdings, Inc.

(56) References Cited

OTHER PUBLICATIONS

"Are Toeprints Unique, Like Fingerprints?" Retrieved on Jun. 23, 2016.
Sampath Srinivas, Dirk Balfanz, Eric Tiffany, Alexi Czeskis, "Universal $2^{nd}$ Factor (U2F) Overview", May 14, 2016, FIDO Alliance.
"Sonavation Announces Fingerprint Imaging Through Smart Phone OLED Display," Feb. 22, 2016.
Dario Borghino, "Wearable Thermoelectric Generator Could Extend Your Smartwatch's Battery Life", Apr. 14, 2014, Gizmag.
"Inductive Charging", May 6, 2016, Wikimedia Foundation, Inc.
"Near Field Communication", Apr. 29, 2016, Wikimedia Foundation, Inc.
Sumi Das, "A Keyboard that Rises Up From Flat Touch Screens," Feb. 13, 2013.
Jessica Leber, "A Shape-Shifting Smartphone Touch Screen," Dec. 3, 2012.
Matthew Frankel, "Could This Be the Bank of the Future?" Nov. 9, 2014.
"Contactless Payment," Jul. 27, 2016, Wikimedia Foundation, Inc.
Zhiquin Chen, "Java Card Technology for Smart Cards: Architecture and Programmer's Guide," pp. 11-14, Copyright 2000, Sun Microsystems, Inc., Palo Alto, California.

ORGANIC LIGHT EMITTING DIODE ("OLED") UNIVERSAL PLASTIC

CROSS-REFERENCE TO RELATED APPLICATIONS

This application is a continuation of U.S. patent application Ser. No. 15/187,931, filed on Jun. 21, 2016, which is hereby incorporated by reference in its entirety.

FIELD OF TECHNOLOGY

Aspects of this disclosure relate to a purchasing instrument with enhanced electronic features.

BACKGROUND

Typically, sensitive data associated with a credit card, or other purchasing instrument, is printed on a face (front or back) of the credit card. The sensitive data may include a unique card number, a card holder's name, an expiration date of the credit card number, a card verification value ("CVV") or any other suitable sensitive data.

The sensitive data may be visible to an onlooker who may obtain a copy (e.g., by taking a picture) of the sensitive data. The copy of the sensitive data may be used to initiate fraudulent transactions.

Typically, purchasing instruments may also include sensitive data encoded on a magnetic stripe. The sensitive data encoded on the magnetic stripe is read when the instrument is "swiped" through a card reader. Thieves may utilize a skimming device to obtain a copy of the sensitive data encoded on the magnetic stripe. For example, a thief may utilize a skimming device placed on or in an automated teller machine ("ATM"). The skimmer may be placed over a card slot reader of the ATM and may read the magnetic stripe as the purchasing instrument is inserted into the slot.

A user may not notice that a skimmer has been placed on or in an ATM because the skimmer may not impede legitimate access to the ATM or card reader. Thus, the skimmer may obtain a copy of the sensitive data encoded on a purchasing instrument's magnetic stripe in a manner transparent to the user.

Technology is currently being developed that may reduce a risk of a thief obtaining a copy of sensitive data. For example, some purchasing instruments are now produced with "EMV" chips. EMV is a technology that derives its name from the companies (Europay, MasterCard, and Visa) that helped develop the technology. When the purchasing instrument and its associated EMV chip are inserted into a specialized card reader, the reader powers the EMV chip and the EMV chip generates a new authorization code each time the purchasing instrument is used. Thus, simply copying the sensitive data printed on the face of the purchasing instrument or encoded on the magnetic stripe may be insufficient to initiate a fraudulent transaction.

In addition to technology specifically developed to combat fraud, it would be desirable to leverage other technology to design a purchasing instrument that is more protective of sensitive data associated with a purchasing instrument.

However, a form factor of purchasing instruments is limited. Purchasing instruments are typically 85.60 millimeters ("mm")×53.98 mm×0.8 mm. This limited form factor allows purchasing instruments to fit easily into a user's wallet or pocket yet also presents design challenges. For example, one design challenge involves the difficulty of attempting to include electronic features in a credit-card-size device. For example, to maintain this limited form factor, a purchasing instrument cannot be constructed using a relatively large power supply.

On the other hand, incorporating electronic features into purchasing instruments may provide technology-based solutions that more securely protect sensitive data. Furthermore, incorporating electronic features into purchasing instruments may increase efficient use and functionality of purchasing instruments.

It would be desirable to provide systems and methods for a purchasing instrument that improves security of sensitive data associated with the instruments, enhances usability of the instrument and maintains a limited form factor of the instrument.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1A:
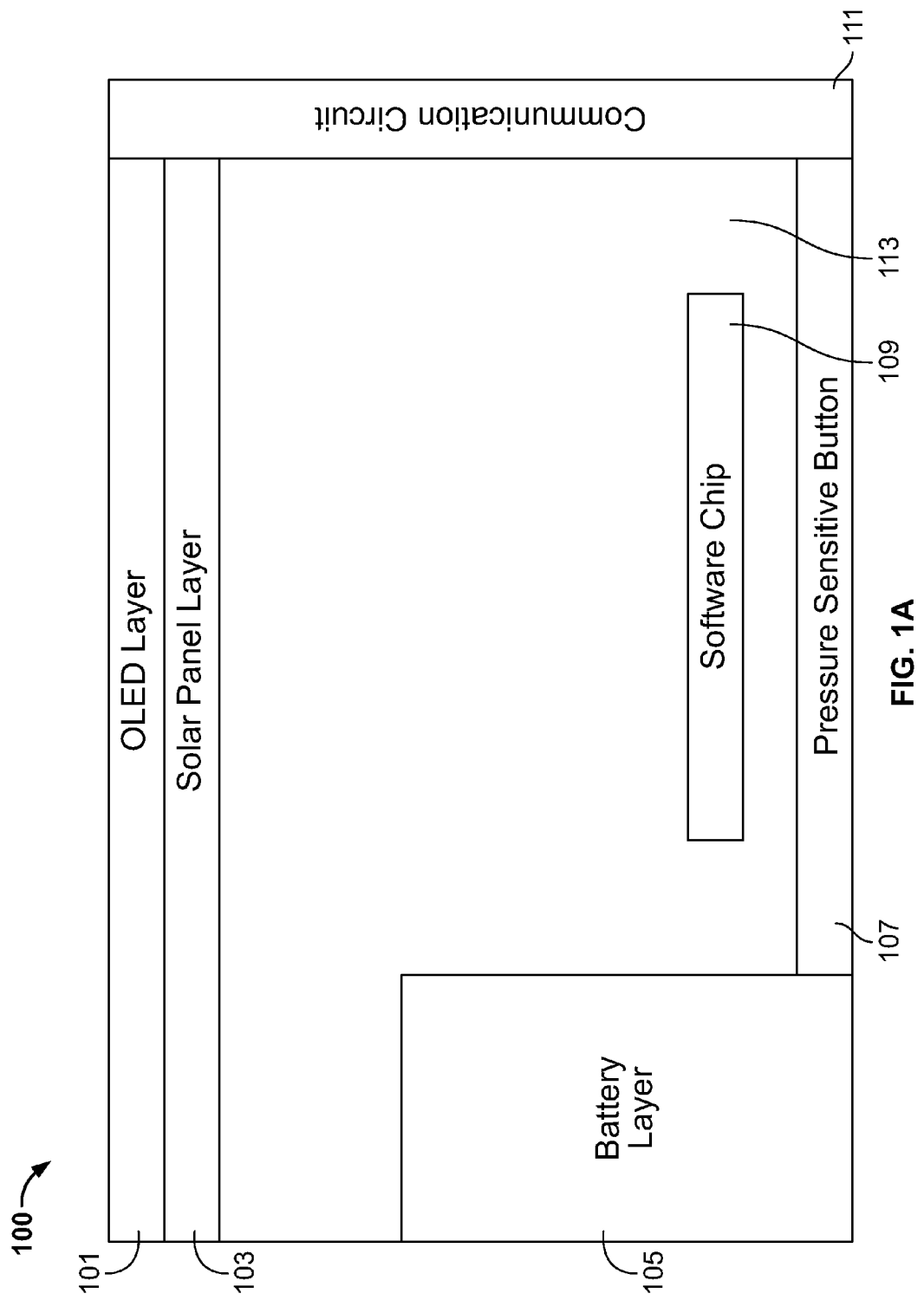
FIG. 1A shows illustrative apparatus in accordance with principles of the invention.

Aspects of the invention relate to a credit-card-size device that leverages organic light emitting diode ("OLED") technology to enhance security of sensitive data associated with a credit card or other purchasing instrument.

Aspects of the invention also relate to a credit-card-size device that leverages organic light emitting diode ("OLED") technology to enhance functionality of a purchasing instrument.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display (hereinafter, "LCD") power must be supplied to the entire backlight even to illuminate just one pixel in the display. In contrast, an OLED display does not necessarily include a backlight. Furthermore, in an OLED display, preferably, only the illuminated pixel draws power.

Therefore, power efficiency of OLED technology presents a possibility for designing electronic purchasing instruments (hereinafter, "smart cards") that provide enhanced security and functionality.

As used herein, a smart card may function as any suitable purchasing instrument. Suitable purchasing instruments may include purchasing instruments that conform to specifications published by the International Organization for Standardization. Illustrative specifications may include: ISO/IEC 7810, ISO/IEC 7811 and ISO/IEC 7816, which are hereby incorporated herein by reference in their entireties. Suitable purchasing instruments may include a credit card, debit card and electronic purchasing devices.

The smart card may not include any sensitive data printed or embossed on a face of the smart card. Sensitive data may be electronically stored within the smart card. The sensitive data stored within, or accessible to, the smart card may only be visible when presented on an OLED display of the smart card. The smart card may store sensitive data associated with two or more purchasing instruments. The smart card may be configured to periodically display sensitive data.

The sensitive data stored on the smart card may be altered. For example, the user may add sensitive data associated with a new purchasing instrument. A representation of different purchasing instruments stored within the smart card may be presented to a user using an OLED display. The OLED display may touch-sensitive. The user may select a purchasing instrument by touching a displayed representation corresponding to the desired purchasing instrument.

In response to a user selection, or in response to certain pre-defined conditions, sensitive data stored on the smart card may be deleted. For example, sensitive data may be deleted in response to expiration of a purchasing instrument or in response to detecting a potential security breach. In some embodiments, sensitive data may be deleted when the smart card associated with a security breach is used at a merchant point-of-sale ("POS") terminal. Waiting for the smart card to be used at the POS terminal may allow a potential fraud and/or thief to be identified at the POS.

The smart card may include one or more biometric sensors. Illustrative biometric sensors may include a fingerprint scanner, camera, microphone or any other suitable sensor for capturing a biometric feature. To authenticate a release of sensitive data, a smart card user (hereinafter, "user") may present a biometric feature to the biometric sensor for verification. The smart card may only authorize release of the sensitive data after verifying the submitted biometric feature.

The smart card may enable more secure financial transactions. For example, online banking transactions may be made more secure by requiring entry of a valid biometric feature, such as a fingerprint, prior to authorizing a transaction or accessing an online banking portal. Embodiments may utilize a camera to verify a biometric feature or identity of a user before authorizing a transaction.

The smart card may utilize an OLED display to visually present color alerts. Alerts may include presenting a customizable "face" on the smart card. Some embodiments may include an OLED display on front and back faces of the smart card.

For example, the OLED display may be configured to glow a particular color in response to detecting a trigger condition or event. Illustrative alerts may indicate whether a purchase is approved/denied, available credit limit, user's spend categories or other suitable indicia.

Embodiments may include using a smart card to request a service from a provider. After requesting the service, the smart card may glow a different color if the user has been waiting longer than a threshold amount of time to access the requested service.

OLED displays may be used to implement "rewards" functionality. For example, an OLED display on a face of the smart card may present available rewards points. The rewards points may be determined based on a detected geographic region or recent user purchase. The OLED displays may be used to present coupons or other deals. The coupons may be pushed to the smart card based on a detected location of the smart card.

A location of the smart card may be detected based on an access point used by the smart card to access a network. In some embodiments, the smart card may include a GPS chip for receiving and/or transmitting GPS signals. In some embodiments, the smart card may include cellular telecommunication capabilities. A location of the smart card may be determined using cellular triangulation techniques.

Illustrative alerts may include fraud alerts. For example, an OLED display of a smart card may flash red when a potential security breach is detected. The security breach may relate to exposure of sensitive data stored on the smart card.

Incorporating an OLED display into a smart card may streamline a process of rebranding a purchasing instrument. Typically, a purchasing instrument such as a credit card is inextricably tied to the sensitive data printed or embossed on a face of the card. A smart card may include an OLED display and sensitive data electronically stored on the card. The OLED display may present information based on the sensitive data stored on the smart card. The sensitive data stored on the card may be changed, and the changed data may be presented to the user using the OLED display. Thus, smart card embodiments described herein are preferably not inextricably tied to sensitive data printed on a face of a purchasing instrument.

Furthermore, sensitive data stored on a smart card may be updated or changed dynamically. For example, sensitive data may be pushed to the smart card over a network. Users no longer need to wait for a new plastic that includes revised sensitive data. The sensitive data may be reissued or revised and stored on the smart card without issuing a new card to the user.

In some embodiments, a combination of a light and or color pattern may be used to authenticate the user. For example, to confirm a physical presence of the smart card, a user may be required to confirm a color displayed on the smart card. In some embodiments, an ATM or POS terminal may include reader that may detect the displayed color or pattern. A pattern may include a quick response ("QR") code. In some embodiments, such light or color patterns may be used in conjunction with other authentication techniques such as biometric authentication and username/password.

Apparatus for a smart card are provided. The smart card may include an array of OLEDs. The OLEDs may form one or more pixels. The OLEDs may form a display of the smart card. The OLED display may be visible on a front face, back face and/or thickness of the smart card. The OLED display may have a thickness that is not greater than 0.25 mm. The OLED display may cover some or all of a surface area. The surface area may include one or more of the faces or thickness of the smart card. For example, the surface area may be 85.60 mm×53.98 mm. The OLED display may cover 10%, 30%, 50%, 75%, 90%, 100% or any suitable percentage of the of the surface area.

The OLED display may include a substrate layer that supports the array of OLEDs. The OLED display may include a circuitry layer that controls illumination of one or more pixels formed by the array of OLEDs. The OLED display may include a barrier layer that keeps contaminants out of the array of OLEDs. A total thickness of the substrate layer, the array of OLEDs, the circuitry layer and the barrier layer may not be greater than 0.5 mm.

The smart card may include a communication circuit. The communication circuit may be configured to implement protocols for wireless communication. For example, the communication circuit may provide Wi-Fi, NFC, Bluetooth or any other suitable mode of wireless communication. Wi-Fi may include passive Wi-Fi with lower power consumption than typical Wi-Fi. The communication circuit may have a thickness that is not greater than 0.8 mm.

The smart card may include a processor circuit. The processor circuit may alternatively be referred to herein as a software chip. The processor circuit may have a thickness that is not greater than 0.25 mm. The processor circuit may include a processor for controlling overall operation of the smart card and its associated components. The smart card may include RAM, ROM, an input/output ("I/O") module and a non-transitory or non-volatile memory.

The I/O module may include a microphone, button and/or touch screen which may accept user provided input. The I/O module may include one or more of a speaker for providing audio output and a video display for providing textual, audiovisual and/or graphical output. The video display may include one or more OLEDs.

Software may be stored within the non-transitory memory and/or other storage medium. The software may provide instructions to the processor for enabling the smart card to perform various functions. For example, the non-transitory memory may store software used by the smart card, such as an operating system, application programs, and an associated database. Alternatively, some or all of computer executable instructions of the smart card may be embodied in hardware or firmware components of the smart card.

Application programs, which may be used by the smart card, may include computer executable instructions for invoking user functionality related to communication, such as email, short message service ("SMS"), and voice input and speech recognition applications. Application programs may utilize one or more algorithms that request alerts, process received executable instructions, perform power management routines or other suitable tasks.

The smart card may include a pressure sensitive button. The pressure sensitive button may have a thickness that is not greater than 0.8 mm. The pressure sensitive button may be actuated by a user to "wake up" the smart card. For example, actuating the pressure sensitive button may activate the processor or communication circuits.

The smart card may operate in a networked environment. The smart card may support establishing network connections to one or more remote computers. Such remote computers may be nodes on a network. The nodes may be personal computers or servers that include many or all of the elements described above relative to the smart card. The network connections may include a local area network ("LAN") and a wide area network ("WAN"), and may also include other networks. When used in a LAN networking environment, the smart card may be connected to the LAN through a network interface or adapter. The communication circuit may include the network interface or adapter.

When used in a WAN networking environment, the smart card may include a modem or other means for establishing communications over a WAN, such as the Internet. The communication circuit may include the modem.

It will be appreciated that the network connections shown are illustrative and other means of establishing a communications link between devices may be used. The existence of any of various well-known protocols such as TCP/IP, Ethernet, FTP, HTTP and the like is presumed, and the smart card can be operated in a client-server configuration to permit a user to retrieve web pages from a web-based server. Web browsers can be used to display and manipulate data on web pages.

The smart card and network nodes may include various other components, such as a battery, speaker, and antennas (not shown). For example, network nodes may be portable devices such as a laptop, tablet, smartphone or any other suitable device for receiving, storing, transmitting and/or displaying relevant information.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include a battery. The battery may be a power source for electronic components of the smart card. For example, the battery may supply power to the OLED display, the communication circuit and the processor circuit. The battery may have a thickness that is not greater than 0.5 mm.

In some embodiments, the smart card may include a plurality of batteries. The batteries may be distributed throughout the smart card. For example, a surface area of the smart card may be apportioned into 2, 3, 4, 5, 8 or any suitable number of surface areas. Each surface area may be associated with a battery. If the smart card is cut into pieces, at least one or more of the OLED display included in each of the pieces may continue to transmit alerts, such as flashing a fraud alert, using a battery within each piece.

In some embodiments, the smart card may include a plurality of communication circuits. The communication circuits may be distributed throughout the smart card. For example, each surface area may include its own communication circuit. If the smart card is cut into pieces, at least one or more of the pieces may continue to transmit/receive information using the communication circuit within each piece.

The smart card's power source may include high frequency signals received from a node on a wireless network. The smart card's power source may include a battery. The smart card may be configured to utilize received high frequency signals to recharge the battery.

In operation, the processor circuit may be configured to control the array of OLEDs and the communication circuit. For example, the processor circuit may power the communication circuit using the battery for a first pre-determined time period. The first pre-determined time period may an amount of time sufficient for the communication circuit to detect whether one or more networks (wired or wireless) are within range of the communication circuit. In some embodiments, the first pre-determined time period may be triggered in response to pressure applied to the pressure sensitive button. In the absence of such pressure, the smart card may conserve battery power by powering-off the communication circuit.

During the first pre-determined time period, the processor circuit may instruct the communication circuit to continuously scan for a communication network. In response to detecting a communication network, the processor circuit may formulate a request for an alert. The request may be encrypted. The request may be associated with a destination. The request may be associated with an identifier stored in the non-transitory memory. The identifier and destination may be sensitive data stored on the smart card. For example, the identifier may be a credit card number associated with the smart card. The destination may be an issuer associated with sensitive data stored on the smart card.

The processor circuit may instruct the communication circuit to transmit an encrypted request to the destination via the communication network. After transmitting the request, the processor circuit may power the communication circuit for a second pre-determined time period. The second pre-determined time period may be equal to, shorter or longer than the first pre-determined time period. The second pre-determined time period may be dynamically determined based on an identity or characteristic of the network.

For example, an expected response time (to the alert request) may be longer for a wireless network than for a wired network. It may take longer to receive a response to an alert request that is submitted over a congested or low-speed network. If the processor circuit does not receive a response from the network during the second pre-determined time period, the processor circuit may power-off the communication circuit. The user may be informed that the request has timed out by an informational message that may be displayed on the OLED display. In some embodiments, the smart card may prompt the user to resubmit the request.

The communication circuit may be powered using a battery or any other suitable power source. In some embodiments, when the processor circuit detects that the smart card is connected to an external power source, the communication circuit or other components may be instructed to remain powered-on until the smart card is disconnected from the power source.

The requested alert may be received from the destination over the network. The alert may be received during the second pre-determined time period. A received alert may include instructions formulated by the destination. The instructions may be executable by the processor circuit.

In response to receiving the alert, the smart card may illuminate one or more pixels on the smart card's OLED display. For example, the alert request may ask for a spending or credit limit associated with the smart card.

A spending limit may include a limit on an aggregate value of transactions conducted using the smart card. The spending limit may be defined for a pre-determined time period, a class of goods, a type of merchant, a merchant category code or any other suitable criteria. A smart card may be associated with a line-of-credit. A value associated with the line-of-credit may be stored on the smart card. A credit limit may include a limit on how much of the line-of-credit may be drawn down using the smart card. The credit limit may be defined for a pre-determined time period, a class of goods, a type of merchant, a merchant category code or any other suitable criteria.

In response to the alert request, a network node may transmit instructions to the smart card. The instructions may be executable by the smart card and configure an OLED display of smart card to glow a particular color, display a graphical representation or display text.

A spending or credit limit may be determined based on location of the smart card or for a given type of product sold at or near the location.

The alert may include instructions that, when executed by the processor circuit, change a color of a pre-determined surface area of the OLED display. For example, the smart card may include an OLED display that covers a front, back and sides of the smart card. The instructions may cause an OLED display on a side of the card to glow red and a text message to be displayed on a front-facing OLED display.

As a more specific example, when received instructions cause the smart card to glow green, at least half of a credit limit associated with the smart card may be available. When received instructions cause the smart card to glow yellow, between half and a quarter of the credit limit may be available. When received instructions cause the smart card to glow red, less than a quarter of the credit limit may be available.

In some embodiments, an alert request may be generated and transmitted without active user input. For example, the user may use the smart card to queue-up for a service at a brick-and-mortar location. Upon entering the location, the user may swipe the smart card though a card reader or actuate a mechanical button on the smart card. The smart card may change color depending on an estimated amount of time remaining until the service is expected to be provided to the user.

In some embodiments, the alert may cause the smart card to glow a color that identifies the user. For example, in response to the using the smart card to request a service, the smart card may glow a color that identifies the user as having a particular status with respect to the service provider. The status may entitle the user to priority treatment or other benefits. Exemplary benefits may include concierge services or reduced rates for services. The status may be determined based on a relationship between the user and an entity that issued the smart card. The relationship may be based on a number of products offered by the issuer used by the smart card user.

In some embodiments, the alert may include executable instructions, that when executed by the processor circuit instruct the OLED display to flash in a pre-determined sequence. The pre-determined sequence may include colors, patterns, illuminated/dark pixel location, length-of-time pixels remain illuminated or any other suitable characteristics. The predetermined sequence may be read by a device (e.g., a network node) that authenticates the smart card.

For example, a user may submit a biometric feature along with a request to release sensitive data stored on the smart card. A network node may attempt to verify that the biometric feature is associated with a known biometric feature of the user. In response to verifying the biometric feature, the network node may transmit executable instructions that cause the smart card to flash in a pre-determined sequence. In response to verifying the biometric feature, the network node may also transmit executable instructions to a reader that instructs the reader to extract the sensitive data in response to capturing the pre-determined sequence. The user may place the card in the vicinity of a reader to gain release the sensitive data. Making a purchase may involve release of sensitive data stored on the smart card.

In some embodiments, this authentication process may be utilized to allow the smart card to access sensitive data stored on a network node. For example, this authentication process may be performed before pushing new or updated sensitive data to the smart card.

An alert transmitted to the smart card may include instructions that, when executed by the processor circuit, form one or more letters on a pre-determined surface area of the OLED display. The one or more letters may expose sensitive data associated with the smart card. The one or more letters may provide information associated with the destination. For example, a location of the smart card may be determined based on a location of a network node such as a network access point. The alert may display deals, coupons or rewards available when making a purchase at or near the detected location.

The alert may include instructions that, when executed by the processor circuit, display a picture on a pre-determined surface area of the OLED display. For example, in response to a request for available credit or spending limits, an emoji or other icon representative of the requested limits may be displayed on the OLED display. For example, if the user is within a predetermined range of credit use, a "thumbs-up" may be displayed.

The smart card may store sensitive data associated with one or more purchasing instruments. Sensitive data may be stored in non-transitory memory on the smart card. For example, the smart card may store sensitive data associated with one or more of user's credit cards, debit cards or other purchasing instruments. The alert may include instructions, that when executed by the processing circuit deletes a first instance of sensitive data stored in the non-transitory memory. The first instance may be deleted in response to detecting activity indicative of fraud. The first instance may be deleted at the request of the user, such as to close a credit card or upon expiration of the credit card.

The alert may include a second instance of sensitive data. When received by the smart card, the second instance of sensitive data may replace the first instance. For example, in response to detecting a security breach associated with the first instance of sensitive data, the first instance may be deleted and replaced with an untainted second instance.

In some embodiments, the alert may cause the OLED display to blink in a predetermined sequence or illuminate prior to deleting sensitive data. In some embodiments, the OLED display may present a message that should be confirmed by the user before deleting sensitive data. The OLED display may be touch-sensitive. The user may confirm the message by touching the displayed message.

When the smart card stores multiple instances of sensitive data, the processor circuit, in operation, may be configured to present, on the OLED display, graphical representations corresponding to each of the multiple instances of sensitive data. For example, in response to a request from a merchant POS terminal, the smart card may present an icon representative of each purchasing instrument stored on the smart card. The user may touch a displayed icon to select sensitive data associated the purchasing instrument to pay for a purchase. In some embodiments, the user may select two or more icons and split payment of the purchase among multiple purchasing instruments.

The smart card may require biometric authentication before releasing sensitive data stored on the smart card. In response to a user selection of a purchasing instrument, the smart card may activate a biometric sensor embedded in the smart card or at a network node.

The biometric sensor may capture a biometric feature of the user and verify the captured feature. Verifying the biometric feature may include comparing an electronic signature of the captured feature to a known electronic signature of a user's biometric feature.

In response to receiving an alert, one or more pixels on the OLED display may be illuminated for a third pre-determined time period. The third pre-determined time period may be determined based on a plurality of non-consecutive time periods following detection, of a plurality of applications of pressure applied to a pressure sensitive button. For example, the smart card may include an application that determines how long to keep the pixels illuminated based on a frequency of how often a user has actuates the button. The user may be expected to actuate the button when the user wishes to activate the OLED display of the smart card. The frequency may indicate how long the user expects the OLED display to be illuminated. The smart card may adapt or learn based on monitoring the user's behavior.

Components of the smart card may be arranged such that a total thickness of the smart card is less than or equal to 0.8 mm. For example, the OLED display, the processor circuit, the pressure sensitive button, the battery and the communication circuit may be arranged such that a total thickness of the smart card is less than or equal to 0.8 mm.

Apparatus for a smart card are provided. The smart card may not be greater than 86 mm×54 mm×0.8 mm.

The smart card may include an OLED display. The OLED display may have a thickness that is not greater than 0.25 mm. The OLED display may cover a surface area that is at least 90% of 85.60×53.98 mm.

The smart card may include multiple OLED displays. For example, the smart card may include a first and a second OLED display. The first OLED display may be visible when viewing a front-face of the smart card. The second OLED display may be visible when viewing a back-face of the smart card.

A processor circuit may be configured to control illumination of the first OLED display and the second OLED display. The processor circuit may control illumination of the OLED displays in response to receiving instructions executable by the processor circuit via a wireless communication circuit.

The processor circuit may be configured to control illumination of pixels in the first OLED display independently of illumination of pixels in the second OLED display. The processor circuit may be configured to control illumination of pixels in the first and second OLED displays such that information displayed on the first and second OLED displays is identical. The processor circuit may be configured to control illumination of pixels in the first and second OLED displays such that information displayed on the first and second OLED displays is contiguous when the smart card is flipped from its front-face to its back-face (or vice versa).

The smart card may include a third OLED display. The third OLED display may be positioned along a thickness of the smart card. In some embodiments, the multiple OLED displays on the smart card may be controlled independently. The OLED displays may be instructed to be illuminated in a specific color, pattern of sequence when the processor circuit detects that the smart card is transmitting/receiving sensitive data. Pixels in each of the OLED displays may be illuminated in a specific sequence. The specific sequence may be used to authenticate the smart card, a user of the smart card or sensitive data stored on the smart card.

Apparatus for a smart card are provided. The smart card may include an OLED display, a wireless communication circuit a processing circuit and a battery. The processing circuit may include a non-transitory memory and a processor.

The non-transitory memory may include a first copy of sensitive data stored thereon. The smart card may include a magnetic stripe. The magnetic stripe may include a second copy of the sensitive data stored on the non-transitory memory. The magnetic stripe may be readable by a card reader. The magnetic stripe may allow the smart card to be backwards compatible with POS terminals, ATMs or other devices that read magnetic stripes. The magnetic stripe may be positioned underneath an OLED display of the smart card.

The processing circuit may be configured to control illumination of the OLED display and release of the first copy of sensitive data via the communication circuit. When the smart card is being read by the card reader, the card reader may charge the battery and read the second copy of the sensitive data encoded on the magnetic stripe.

The smart card may include a second OLED display. The second OLED display may have a thickness that is not greater than 0.25 mm. The second OLED display may have a surface area that is at least 90% of 85.60 mm×53.98 mm. The magnetic stripe may be positioned within a thickness of the smart card between the first OLED display and the second OLED display.

A total thickness the smart card may not be greater than 0.8 mm. For example, a smart card that includes a first OLED display, a second OLED display, a processor circuit, a battery, a magnetic stripe and a wireless communication circuit may not be greater than 0.8 mm thick.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative side view of smart card 100. Smart card 100 includes OLED layer 101. OLED layer 101 may form a rollable, thin OLED display with lower power consumption than other display technology.

Smart card 100 may include a touch sensor (not shown). The touch sensor may be not greater than 0.001 mm thick. In some embodiments, the touch sensor may be embedded within OLED layer 101. Integrating the touch sensor into the OLED layer 101 may reduce reflectivity due to any space between the touch sensor and OLED layer 101. Reducing reflectivity may increase visibility of information presented using OLED layer 101.

Using OLED layer 101 to display information may have several technical advantages. OLED displays may provide lower power consumption, wider viewing angles, better colors, higher contrast, operate in a wider temperature ranges and enable faster refresh rates than other display technology. In some embodiments, OLED displays may be fabricated directly on control circuitry. OLED displays may only include trace amounts of heavy metals. Thus, when disposed of, OLED display may be less harmful to the environment than other display technology.

Smart card 100 includes solar panel layer 103. OLED displays may be transparent when not illuminated. Thus when OLED layer 101 is not illuminated, OLED layer 101 may be transparent. Sunlight may pass through OLED layer 101 and reach solar panel layer 103. Solar panel layer 103 may convert solar energy into electricity that powers one or more components of smart card 100. Solar panel layer 103 may be thin enough to be flexible.

Smart card 100 includes battery 105. Battery 105 may be rechargeable. Battery 105 may be flexible. Battery 105 may be recharged by power generated by solar panel layer 103. Battery 105 may be rechargeable from a power source external to smart card 100.

Smart card 100 includes software chip 109. Software chip 109 may control overall operation of smart card 100 and its associated components. Software chip 109 may include the processor circuit. Software chip 109 may include a non-transitory memory. Smart card 100 may include non-transitory memory locations (not shown) within thickness 113. Software chip 109 may access such memory locations. The non-transitory memory locations may store instructions, that when executed by software chip 109, cause smart card 100 to perform various functions.

For example, memory locations may store software used by smart card 100, such as an operating system, application programs and an associated database.

Smart card 100 includes communication chip 111. Communication chip 111 may be a communication circuit. Communication chip 111 may provide smart card 100 with wireless communication functionality. Communication chip 111 may enable smart card 100 to communicate using a variety of communication protocols including, Wi-Fi, Bluetooth, Ethernet, NFC and cellular telecommunications.

Smart card 100 also includes pressure sensitive button 107. Pressure sensitive button 107 may be mechanically actuated. Actuation of pressure sensitive button 107 may provide an electronic signal to software chip 109 or any other component of smart card 100.

For example, mechanical actuation of pressure sensitive button 107 may power-on and/or power-off software chip 109. Mechanical actuation of pressure sensitive button 107 may inform software chip 109 of a user's selection of choices displayed using OLED layer 101.

FIG. 1 shows illustrative components 101-113 of smart card 100 in an arrangement within a thickness of smart card 100. The arrangement shown in FIG. 1 is illustrative. Smart card 100 may include additional components not shown in FIG. 1, such as a biometric sensor. One or more of components 101-113, and any additional components, may be arranged within smart card 100 in any suitable fashion. For example, pressure sensitive button may be located in space 113. OLED layer 101 and/or solar panel layer 103 may flex or bend to allow a user to mechanically actuate pressure sensitive button 107.

Some embodiments may not include all of components 101-113. For example, a smart card may not include solar panel layer 103 or pressure sensitive button 107.

Figure 1B:
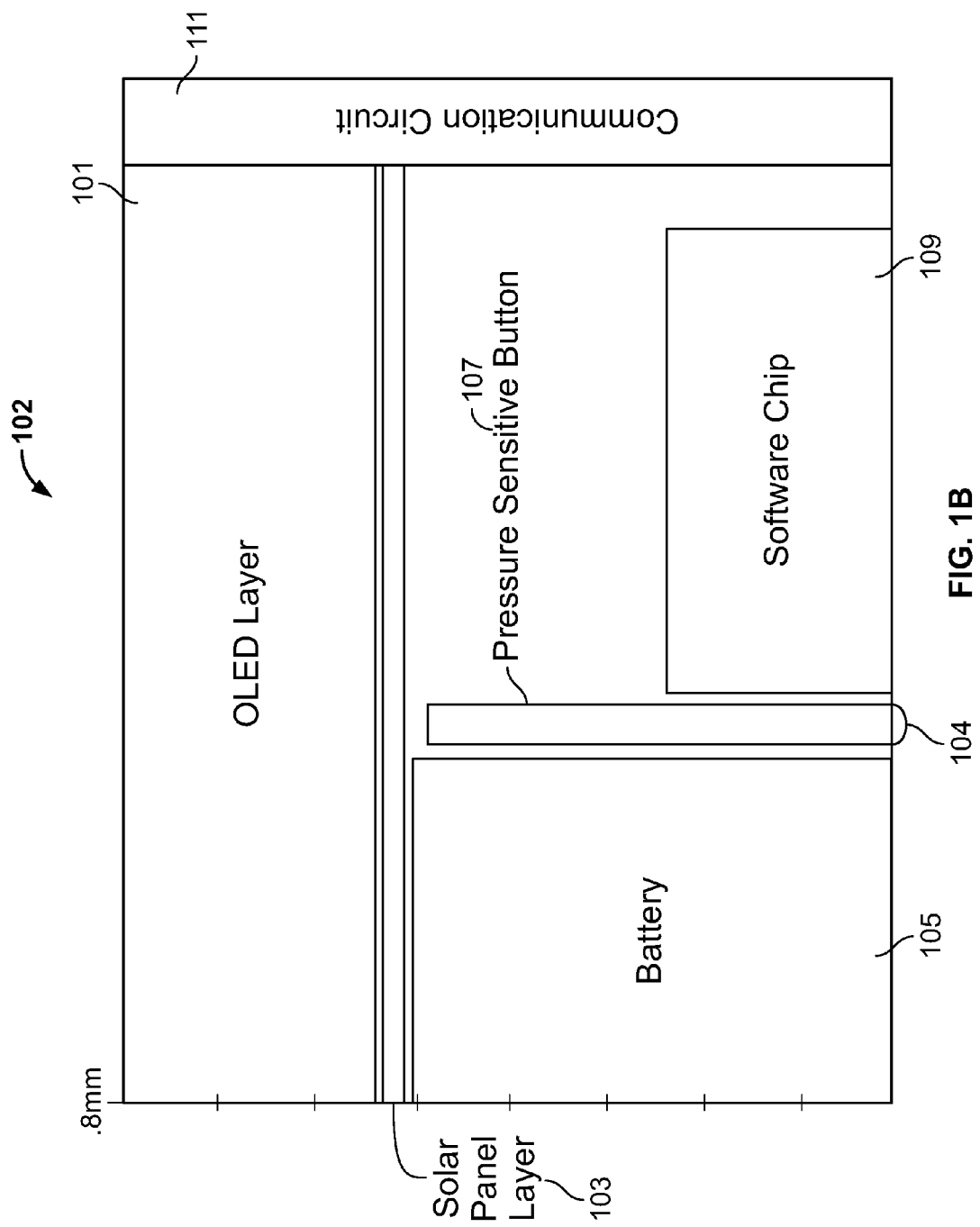
FIG. 1B shows illustrative apparatus in accordance with principles of the invention.

FIG. 1B shows illustrative view 102 of a smart card having a thickness of 0.8 mm. View 102 shows illustrative thicknesses of components 101-111. View 102 shows that in some embodiments, pressure sensitive button 107 may include a portion 104 that protrudes from a surface of a smart card. In some embodiments, pressure sensitive button 107 may include a portion 104 that dips below a surface of the smart card.

Figure 2:
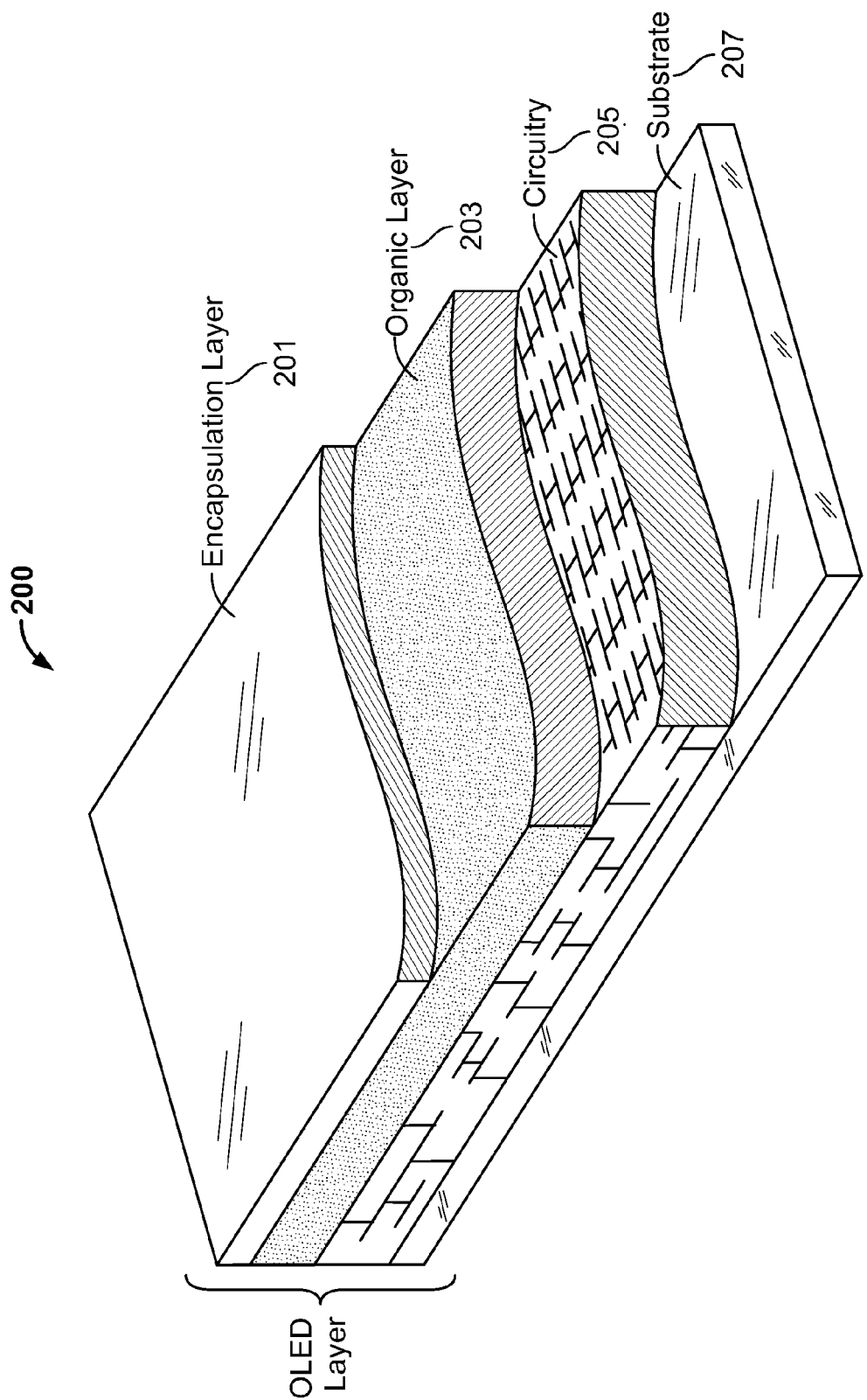
FIG. 2 shows illustrative apparatus in accordance with principles of the invention.

FIG. 2 shows structures 200 of an illustrative OLED layer, such as OLED layer 101 (shown in FIG. 1). Structures 200 include four layers: encapsulation layer 201, organic layer 203, circuitry layer 205 and substrate layer 207.

Encapsulation layer 201 protects the OLED layer from exposure to oxygen, water and other contaminants. Preferably, encapsulation layer 201 is flexible and transparent. Glass is a typical material for constructing encapsulation layer 201. When glass is used to construct encapsulation layer 201, the glass may be very thin and flexible. For example, the glass may be between 50 micrometers (μm) and 100 μm thick.

In some embodiments, encapsulation layer 201 may be constructed using thin-film encapsulation techniques such as Atomic Layer Deposition ("ALD"). ALD is a process that utilizes chemicals that, when deposited on a material, react to create a solid, thin film.

Structures 200 include organic layer 203.

Organic layer 203 typically includes an emissive solid-state semiconductor. Organic layer 203 may be constructed from a thin film of organic (carbon-based) material. For example, organic layer 203 may include one or more OLEDs. When electricity is applied to an OLED within organic layer 203, electrons flow through organic layer 203 and release photons, thereby emitting light. Different types of emissive materials may be used. Each type of material may be associated with a different color light. An intensity of light emitted by organic layer 203 may be controlled by the amount of electricity flowing through organic layer 203.

Organic layer 203 may be doped with "host" materials. Host material may affect properties, such as power efficiency, of organic layer 203. For example, organic layer 203 may be doped with emitter materials that improve its operation and/or achieve a desired color.

Organic layer 203 may include two or more sub-layers (not shown). For example, organic layer 203 may include 5, 10 or 15 sublayers. Illustrative sub-layers may include: (1) an electron transport layer, (2) a blocking layer, (3) an emissive layer, (4) a hole transport layer and (5) an injection layer. The sub-layers may enhance an efficiency of the emissive layer.

For example, an emissive layer may be placed between a cathode and an anode. When electricity is applied, electrons flow from the cathode to the anode. OLED displays may be driven by either electrical current or voltage. In a preferred embodiment, the OLED display is driven by current. The cathode inserts electrons into the emissive layer, and the anode removes the electrons. The electron "flow" through the emissive layer releases photons, generating light. The color of the generated light may be changed by including different types of materials within the emissive layer.

A direction of light emitted by the organic layer may be controlled by a degree of transparency of the anode and/or cathode. In some embodiments, a cathode may be reflective. Such a cathode may be constructing using an aluminum based-compound or lithium fluoride. An anode may be transparent. A transparent anode may preferably be constructed using indium tin oxide. In such embodiments, when current flows between the cathode and anode, light is emitted through circuitry layer 205 and substrate 207. Circuitry layer 205 and substrate 207 may be transparent. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution displays.

Additionally, top-emitting designs may allow organic layer 203 to be formed on a non-transparent substrate. Small- and medium-sized OLED displays (e.g., 1-7 inches) are typically constructed using top-emitting techniques.

Organic layer 203 may form one or more pixels. Different architectures are available for forming pixels using OLEDs. One architecture includes positioning different color (e.g., red, green and blue) OLEDs adjacent to each other. Another architecture may include stacking different color OLEDs on top of each other. OLEDs may be stacked because materials used to construct organic layer 203 may be transparent. A stacked design may provide a smaller pixel size and higher resolution.

Structures 200 include circuitry layer 205. Circuitry layer 205 includes electronics that drive one or more pixels formed within organic layer 203. Preferably, amorphous silicon ("a-Si") and low temperature polysilicon ("LTPS") may be used to construct circuitry layer 205. In some embodiments, circuitry layer 205 may be transparent.

Substrate layer 207 supports circuitry layer 205, organic layer 203 and encapsulation layer 201. Substrate layer 201 may be constructed using various materials. For example, substrate layer 207 may be constructed using glass, plastic or metal materials. In some embodiments, such as in bottom-emitting OLEDs, substrate layer 207 may function as encapsulation layer 201.

Figure 3:
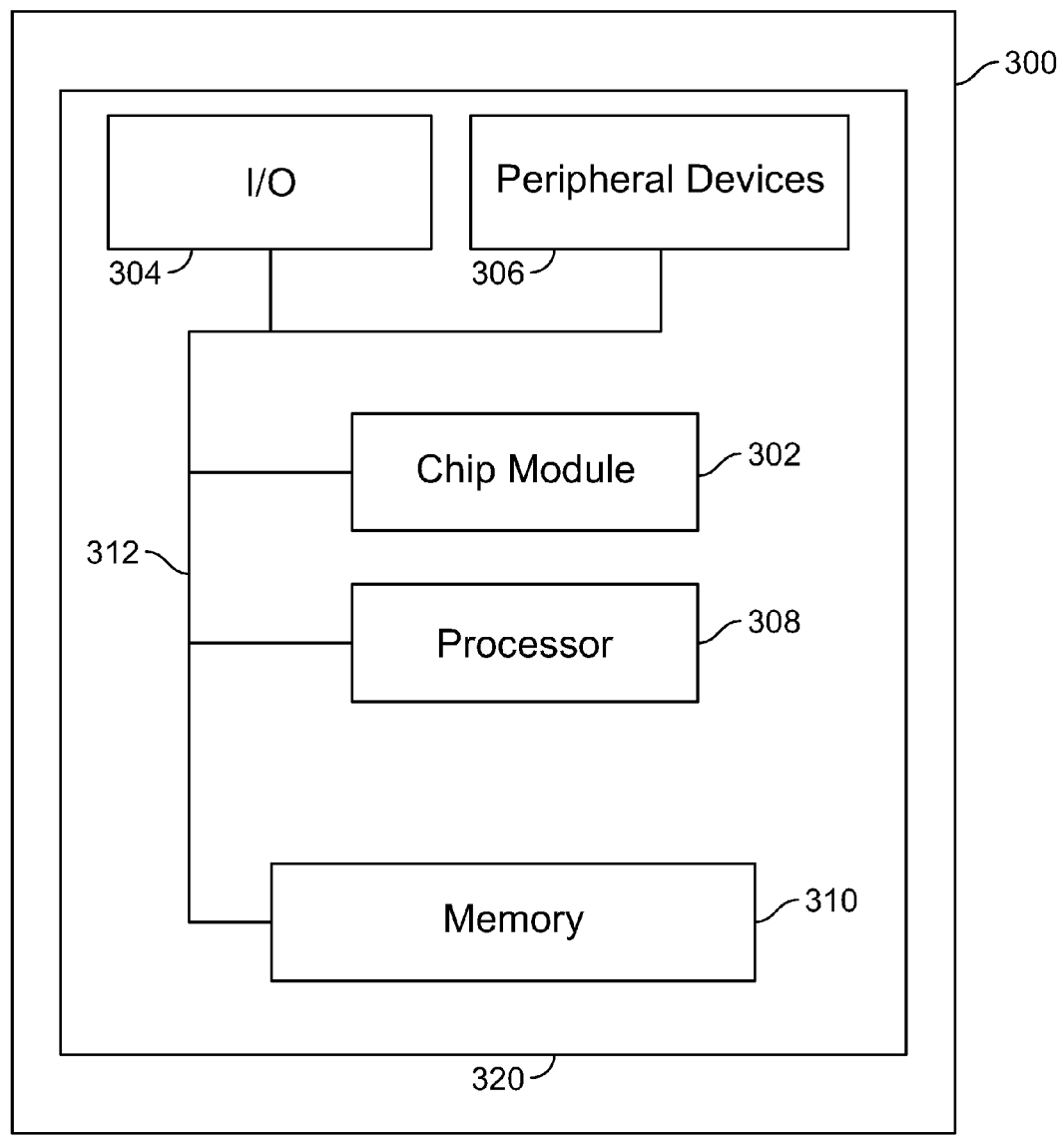
FIG. 3 shows illustrative apparatus in accordance with principles of the invention.

FIG. 3 shows an illustrative software chip 300. Software chip 300 may include chip module 302, which may include one or more integrated circuits, and which may include logic configured to perform any suitable logical operation.

Software chip 300 may include one or more of the following components: I/O circuitry 304, which may include a transmitter device and a receiver device and may interface with fiber optic cable, coaxial cable, telephone lines, wireless devices, PHY layer hardware, a keypad/display control device or any other suitable encoded media or devices; peripheral devices 306, which may include counter timers, real-time timers, power-on reset generators or any other suitable peripheral devices; logical processing device 308, which may compute data structural information, structural parameters of the data, quantify indices; and machine-readable memory 310.

Machine-readable memory 310 may be configured to store, in machine-readable data structures: sensitive data, electronic signatures of biometric features or any other suitable information or data structures.

Components 302, 304, 306, 308 and 310 may be coupled together by a system bus or other interconnections 312 and may be present on one or more circuit boards such as circuit board 320. In some embodiments, the components may be integrated into a single chip. The chip may be silicon-based.

FIGS. 4-9 show illustrative layers that may be present within an illustrative smart card.

Figure 4:
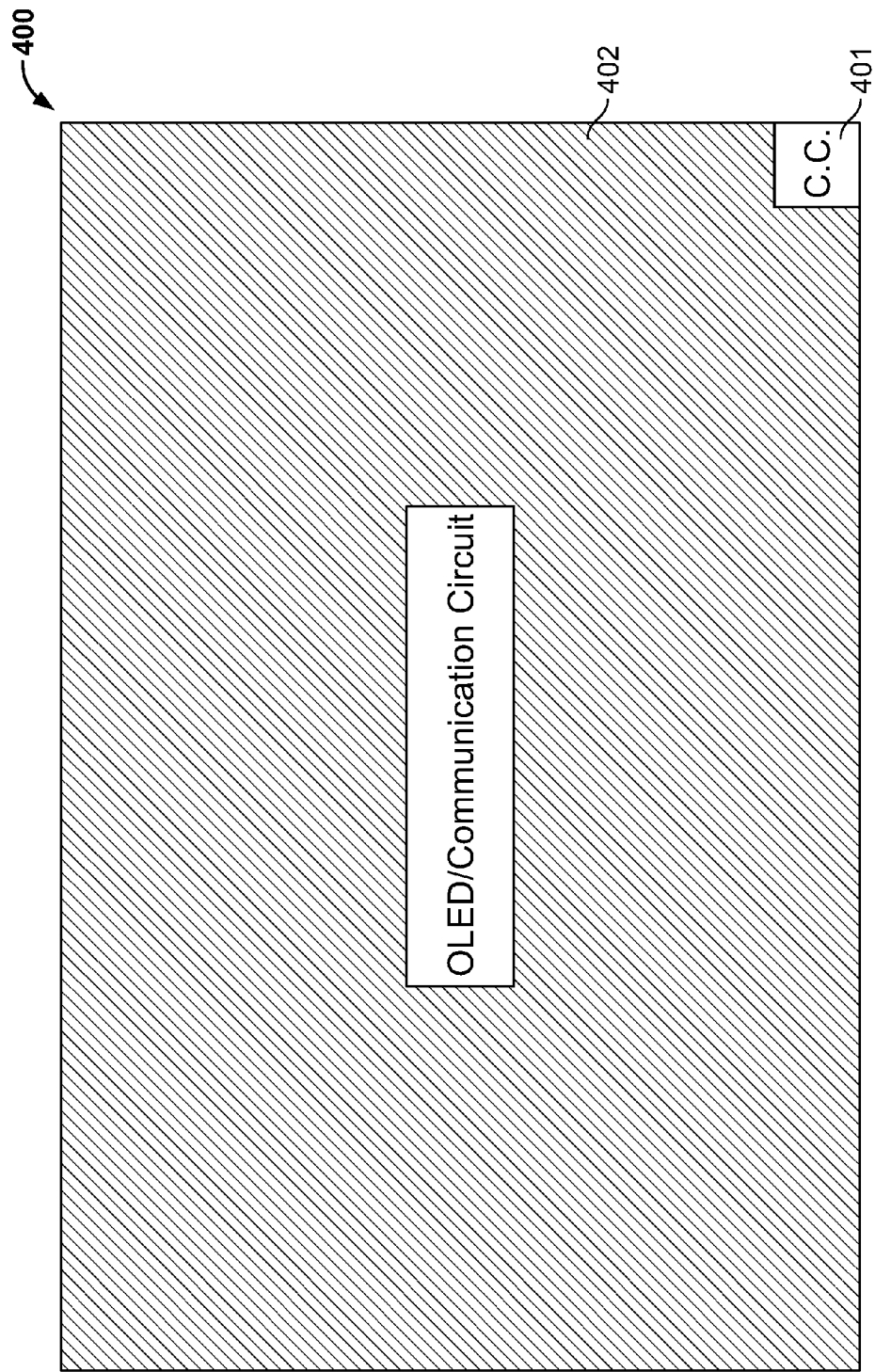
FIG. 4 shows illustrative apparatus in accordance with principles of the invention.

FIG. 4 shows illustrative layer 402. Layer 402 includes OLED layer (such as OLED layer 200, shown in FIG. 2). FIG. 4 also shows that, in some embodiments, communication circuit 401 may penetrate layer 402.

Figure 5:
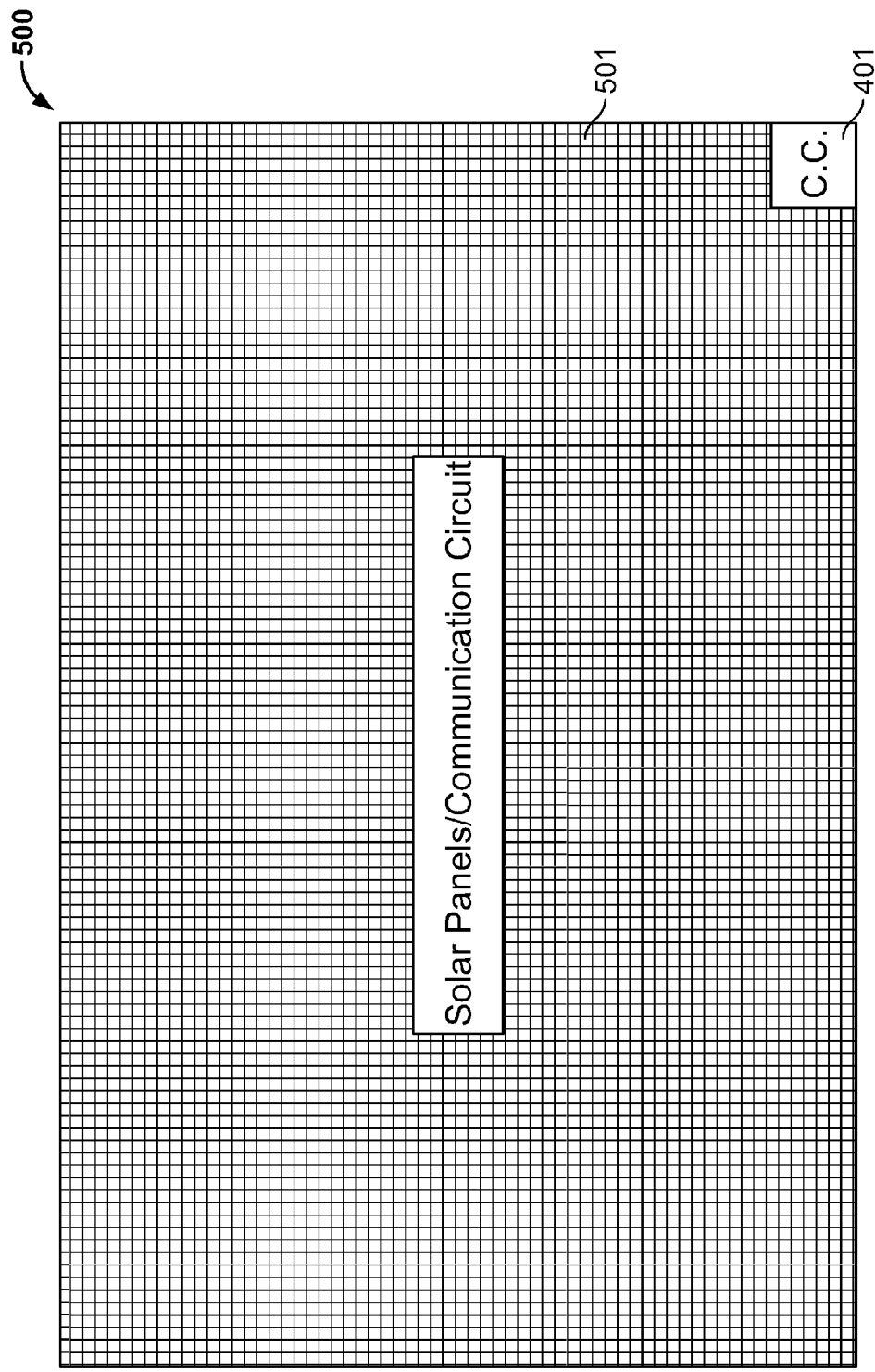
FIG. 5 shows illustrative apparatus in accordance with principles of the invention.

FIG. 5 shows illustrative layer 500. Layer 500 includes solar panels 501 that may be used to power various components of a smart card (e.g., circuitry layer 205, shown in FIG. 2). FIG. 5 also shows that, in some embodiments, communication circuit 401 may penetrate layer 500.

Figure 6:
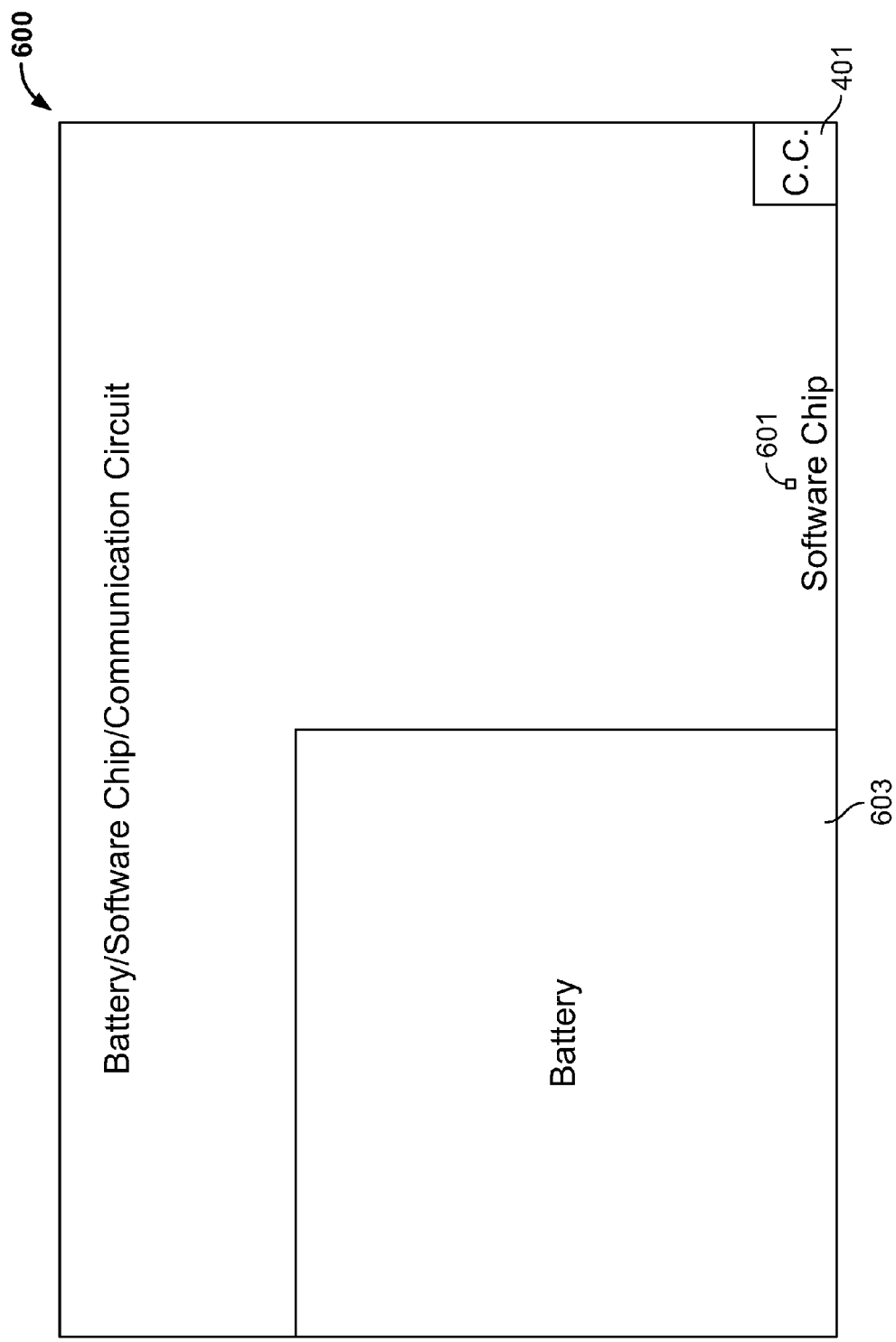
FIG. 6 shows illustrative apparatus in accordance with principles of the invention.

FIG. 6 shows illustrative layer 600. Layer 600 includes software chip 601. Software chip 601 may include one or more features of software chip 109 (shown in FIG. 1). Layer 600 includes battery 603. Battery 603 may include one or more features of battery layer 105 (shown in FIG. 1). FIG. 6 shows that, in some embodiments, communication circuit 401 may penetrate layer 600.

Figure 7:
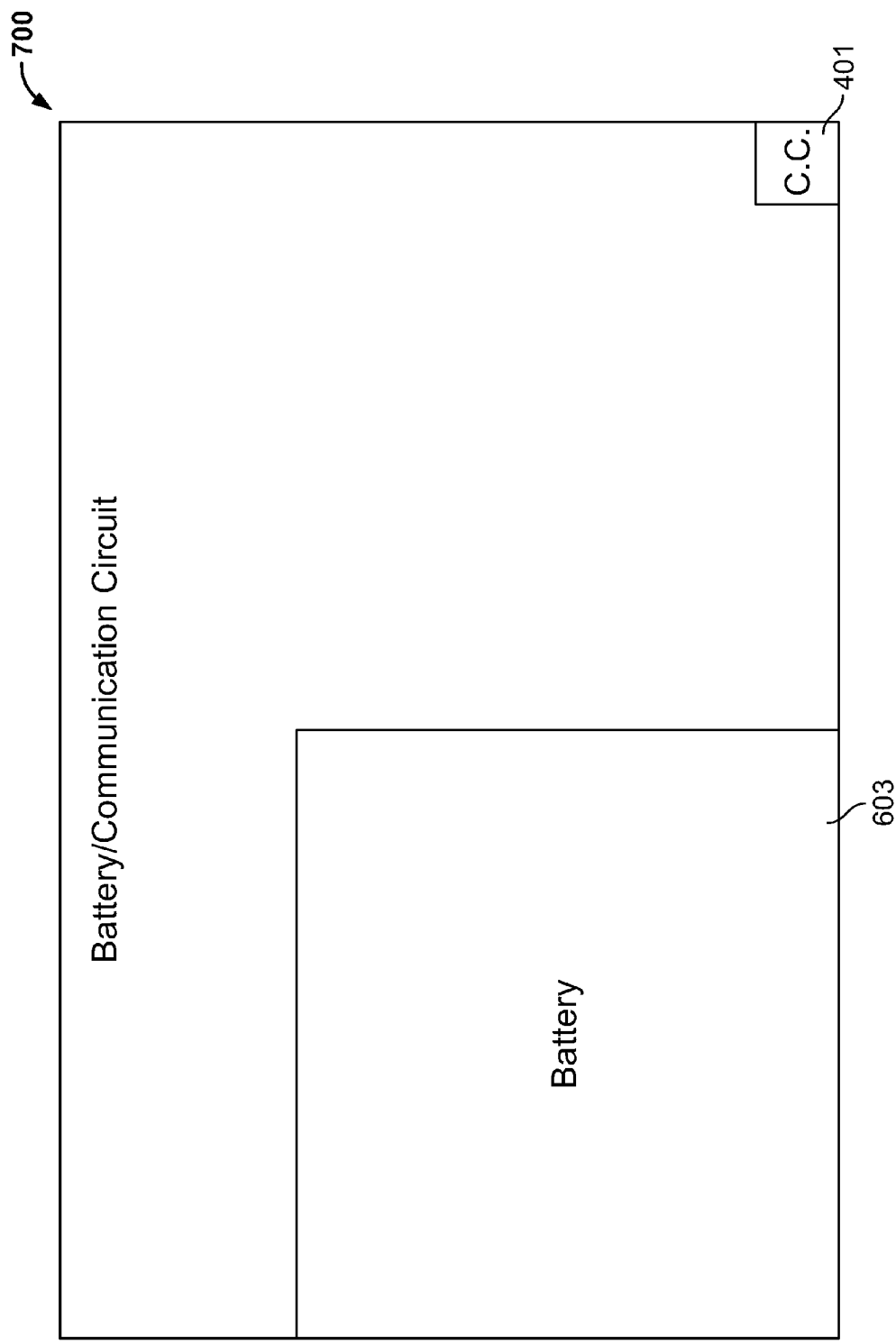
FIG. 7 shows illustrative apparatus in accordance with principles of the invention.

FIG. 7 shows illustrative layer 700. FIG. 7 shows that, in some embodiments, battery 603 may penetrate layer 700. FIG. 7 shows that, in some embodiments, communication circuit 401 may penetrate layer 700.

Figure 8:
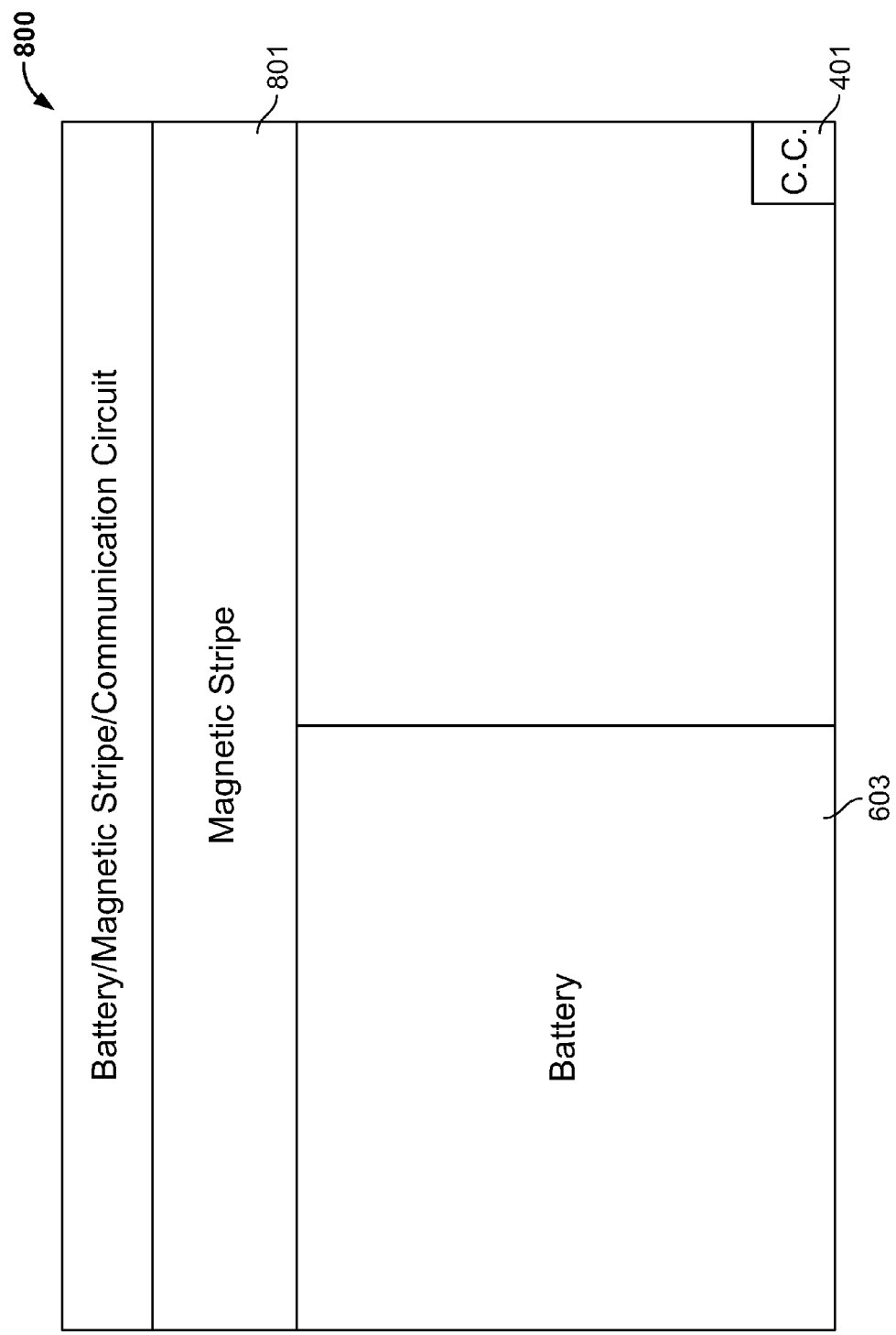
FIG. 8 shows illustrative apparatus in accordance with principles of the invention.

FIG. 8 shows illustrative layer 800. FIG. 8 shows that, in some embodiments, battery 603 may penetrate layer 800. FIG. 8 shows that, in some embodiments, communication circuit 401 may penetrate layer 800.

FIG. 8 shows that layer 800 may include magnetic stripe 801. Magnetic stripe 801 may include magnetically encoded information. Magnetic stripe 801 may provide backwards compatibility for smart cards described herein.

Figure 9:
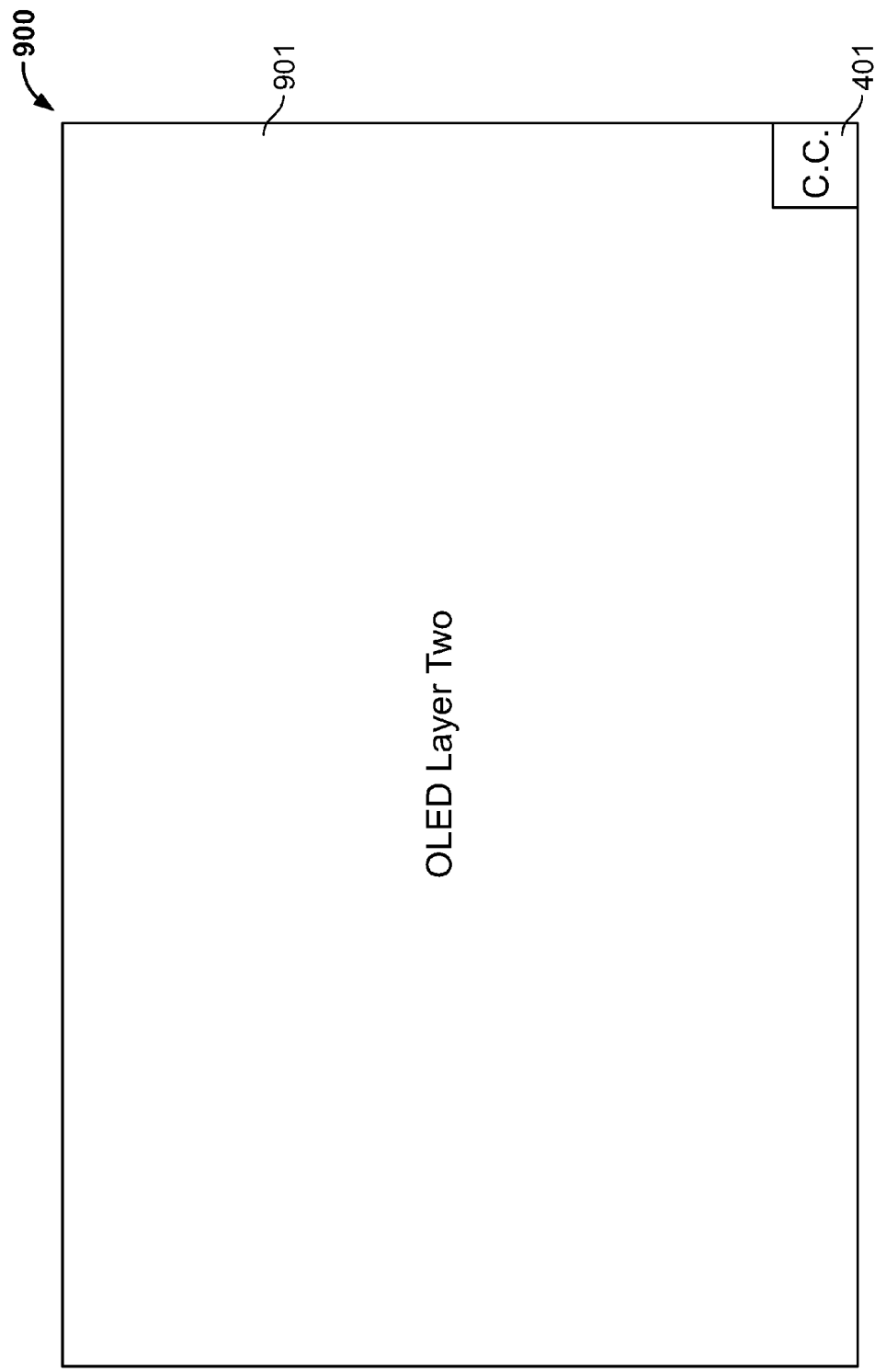
FIG. 9 shows illustrative apparatus in accordance with principles of the invention.

FIG. 9 shows illustrative layer 900. Layer 900 includes a second OLED layer 901. Second OLED layer 901 may include one or more features of OLED layer 200 (shown in FIG. 2). Second OLED layer 901 may allow front and back faces of a smart card to include an OLED display. FIG. 9 also shows that communication circuit 401 may penetrate layer 900.

Figure 10:
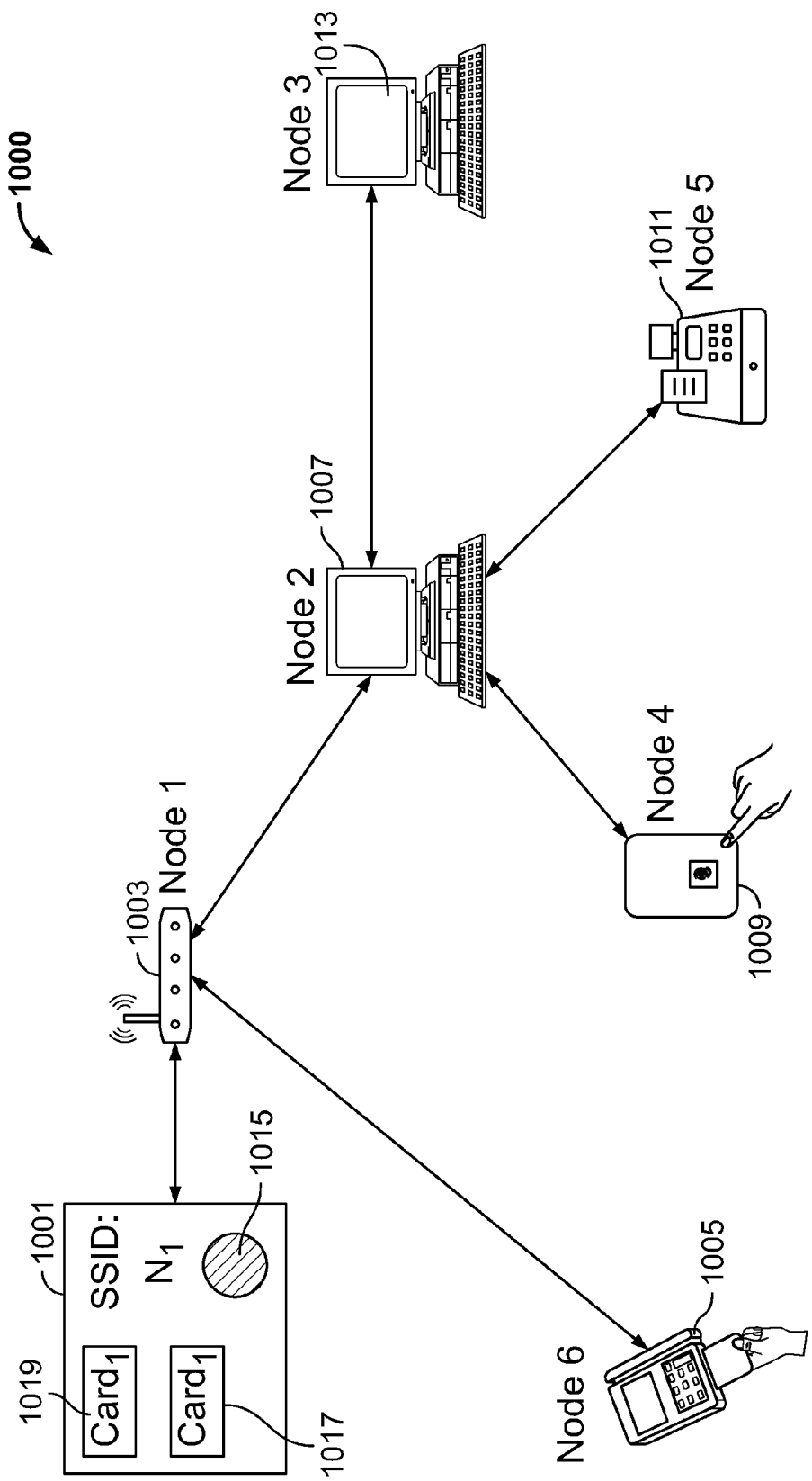
FIG. 10 shows illustrative apparatus in accordance with principles of the invention.

FIG. 10 shows illustrative network architecture 1000. Network architecture 1000 shows illustrative network nodes that may be accessed by smart card 1001. For example, smart card 1001 may access the network via access point 1003. The network may be a wireless network. The network may be a wired network. The network may include a combination of wired and wireless nodes. The network may include two or more networks. For example, node 3 (1013) may represent a second network accessible via node 2 (1007).

Access point 1003 may enable smart card 1001 to access other nodes on the network. In some embodiments, one or more of nodes 1-6 may be access points. Smart card 1001 may present an identity of the network on an OLED display. The OLED display may include one or more features of OLED layer 200 (shown in FIG. 2). Smart card 1001 may be prompted to authenticate itself to one or more nodes on the network.

Smart card 1001 may display available purchasing instruments 1017 and 1019 stored on smart card 1001. In some embodiments, when prompted by POS terminal 1011, a user may touch the displayed purchasing instrument to transmit sensitive data associated with a purchasing instrument to pay for a purchase.

In some embodiments, before smart card 1001 transmits sensitive data to POS terminal 1011, the user may be required to verify his/her presence by pressing button 1015. In some embodiments, button 1015 may include a biometric scanner, such as a fingerprint reader. In some embodiments, POS terminal 1011 may prompt the user to present a biometric feature using biometric scanner 1009.

For example, utilizing biometric scanner 1009 may avoid the user having to physically access smart card 1001 (e.g., remove it from a wallet). In some embodiments biometric scanner 1009 may be integrated into POS terminal 1011.

In some embodiments, smart card 1001 may be swiped though legacy card reader 1005. Legacy card reader 1005 may read account information stored on magnetic stripe 801 (shown in FIG. 8). To provide more a secure authentication, user may be prompted to depress button 1015 or present a biometric feature using a biometric scanner embedded within button 1015. The transaction may be approved or denied based on a result of the biometric scan.

For example, the node may require verification that the scanned biometric feature matches a known biometric feature associated with the user of smart card 1001. The verification may be performed by smart card 1001 or by a node on the network.

Figure 11:
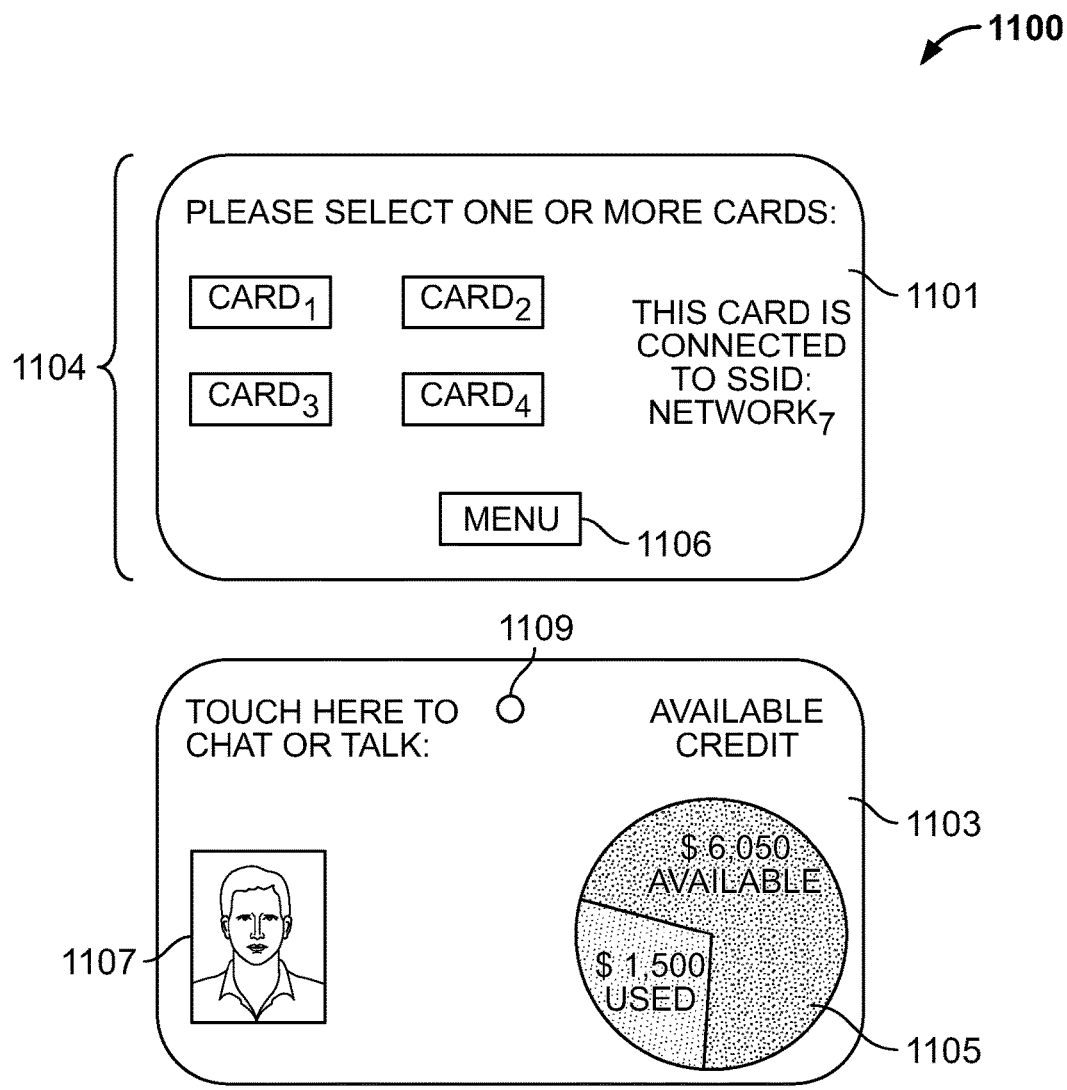
FIG. 11 shows illustrative apparatus in accordance with principles of the invention.

FIG. 11 shows illustrative smart card 1100. Smart card 1100 may include one or more features of smart card 100 (shown in FIG. 1). Information may be stored on smart card 1100 and may be displayed using OLED layer 101 (shown in FIG. 1). The information may include sensitive data. Smart card 1100 includes front-face 1101 and back-face 1103. FIG. 11 shows illustrative information that may be displayed on smart card 1100. Smart card 1100 may utilize OLED display technology to present the information. Smart card 1100 may include at least two OLED displays. For example, smart card 1100 may include a first OLED layer as shown in FIG. 4 and a second OLED layer as shown in FIG. 9.

FIG. 11 shows that front-face 1101 may display an identity of a network that is in communication with smart card 1100. Smart card 1100 is shown displaying that it is connect to a network having a service set identifier "Network 7."

FIG. 11 shows that front-face 1101 may display a representation of sensitive data associated with one or more purchasing instruments stored on smart card 1100. A user of smart card 1100 may touch one or more of the representations to select sensitive data that will be transmitted by smart card 1100. In embodiments that include a touch screen, the user may touch one or more of the displayed representations to make a selection.

Smart card 1100 is shown displaying representations 1104 of four credit cards that are stored on smart card 1100. A user of smart card 1100 may select one or more of representations 1104 to complete a purchase. In response to selecting one or more of representations 1104, sensitive data associated with the user selection may be transmitted from smart card 1100.

FIG. 11 also shows that front-face 1101 may provide access to menu option 1106. The menu option 1106 may provide access to settings associated with smart card 1100. Illustrative settings may include requiting all information to be displayed in graphical form, changing a user name/password, updating biometric information, adjusting power settings, turning on/off wireless communication or any suitable setting.

FIG. 11 also shows information displayed on back-face 1103 of smart card 1100. Back-face 1103 may also utilize OLED display technology to present information to the user.

Back-face 1103 is shown displaying credit limit information 1105. Credit limit information 1105 may be pushed to smart card 1100 over a network, such as via network nodes 1007 or 1013 (shown in FIG. 10). Credit limit information 1105 may be pushed to smart card 1100 in response to an alert request submitted by a user of smart card 1100. In some embodiments, credit limit information 11105 may be considered sensitive data. A user of smart card 1100 may be required to provide a biometric feature or other credentials before smart card 1100 displays credit limit information 1105.

Smart card 1100 is also shown displaying video 1107. Smart card 1100 may also include camera 1109. Smart card 1100 may also include a microphone and/or speaker (not shown).

Information displayed on front-face 1101 may be displayed on back-face 1103. Information displayed on back-face 1103 may be displayed on front-face 1101.

Figure 12:
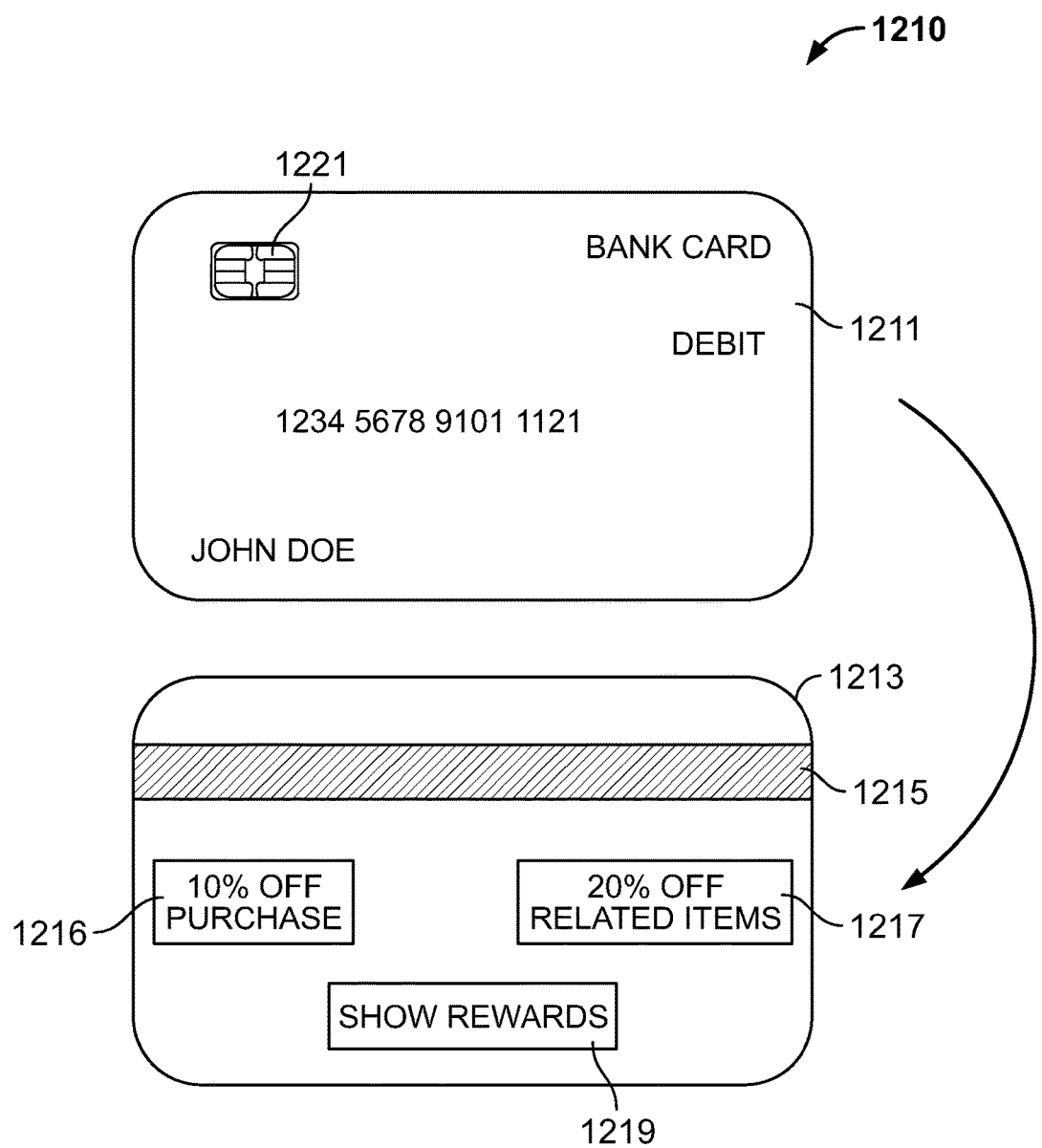
FIG. 12 shows illustrative apparatus in accordance with principles of the invention.

FIG. 12 shows illustrative opposing faces 1211 and 1213 of smart card 1210. Smart card 1210 may include one or more features of smart card 100 (shown in FIG. 1).

Information may be displayed on face 1211 using a first OLED display, such as the OLED layer shown in FIG. 4. Information may be displayed on face 1213 using a second OLED display, such as the OLED layer shown in FIG. 9.

FIG. 12 shows that face 1211 may display sensitive data associated with user "John Doe." Sensitive data displayed on face 1211 may be dynamically altered based on a user selection. For example, smart card 1210 may store sensitive data associated with one or more credit cards. The user may select to display on face 1211 the sensitive data with the one or more credit cards.

In some embodiments, sensitive data displayed on face 1211 may be pushed to smart card 1210 from a network node. A network node may instruct smart card 1210 to delete sensitive data stored on smart card 1210.

When face 1211 is displaying sensitive data, face 1213 may display sensitive data or other information that is different from the sensitive data displayed on face 1211. FIG. 12 shows that face 1213 may include magnetic stripe 1215. Magnetic stripe 1215 may allow smart card 1210 to be used with legacy card readers. Face 1213 also displays information 1217 and 1219. Information 1217 and 1219 may be dynamically altered based on a detected location of smart card 1210. For example, information 1217 may include discounts based on a location of smart card 1210 within a pre-determined radius of a retail location. Information 1217 may be dynamically altered based on items purchased using smart card 1210.

Information 1219 may be pushed to smart card 1210 in response to an alert request or in response to detecting an available network.

FIG. 12 also shows that smart card 1210 may include EMV chip 1221. EMV chip 1221 may be accessible through an OLED display on front-face 1211. In some embodiments, EMV chip 1221 may be positioned underneath the OLED display on front-face 1211. In such embodiments, EMV chip 1221 may be accessible via induction or other contactless methods of electronically transferring data and/or power.

Figure 13:
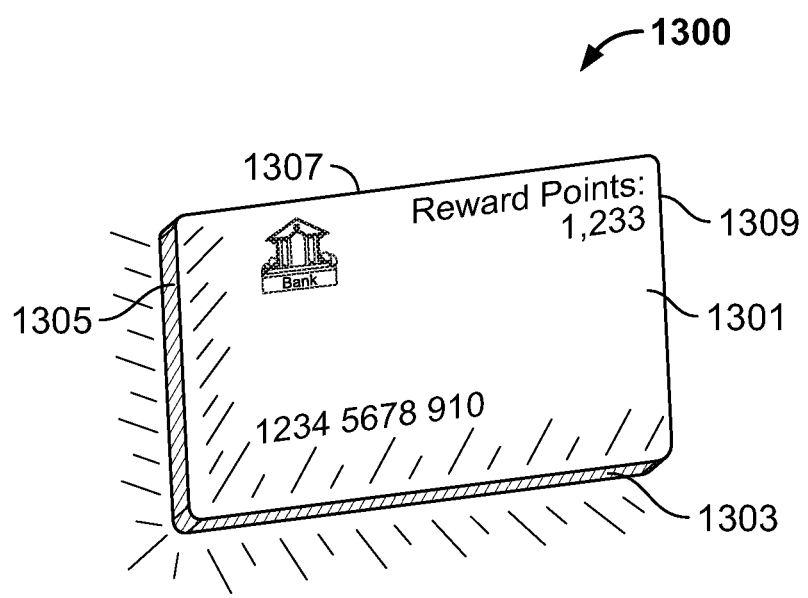
FIG. 13 shows illustrative apparatus in accordance with principles of the invention.

FIG. 13 shows illustrative smart card 1300. Smart card 1300 includes an OLED display on face 1301. Face 1301 may be a front-face or a back-face of smart card 1300. Smart card 1300 includes an OLED display on side 1305. Smart card 1300 also includes an OLED display on side 1303. Smart card 1300 may also include OLED displays on sides 1307 and 1309. FIG. 13 shows each of the OLED displays on smart card 1300 being illuminated.

Each of the OLED displays on smart card 1300 may be illuminated and controlled independently of each other. For example, FIG. 13 shows the OLED display on side 1305 being illuminated and the OLED display on face 1301 displaying text.

FIGS. 14A-14D show smart card 1400. Each of FIGS. 14A-14D is shaded differently to show that smart card 1400 may be illuminated in different colors or patterns. Each of FIGS. 14A-14D also includes different text being displayed on smart card 1400. Smart card 1400 may store multiple instances of sensitive data. Each instance of sensitive data may correspond to a different purchasing instrument (e.g., credit cards, debit cards). In response to user selection, smart card 1400 may display at least a portion of the sensitive data associated with the purchasing instrument corresponding to the user selection.

Figure 14B:
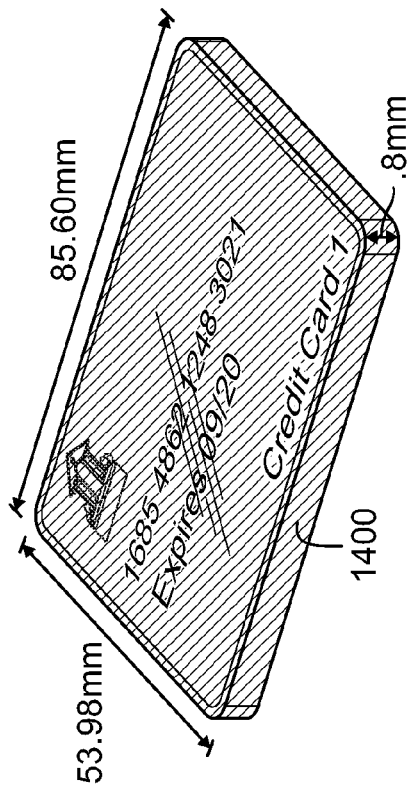
FIGS. 14A-D show illustrative apparatus in accordance with principles of the invention.
Figure 14D:
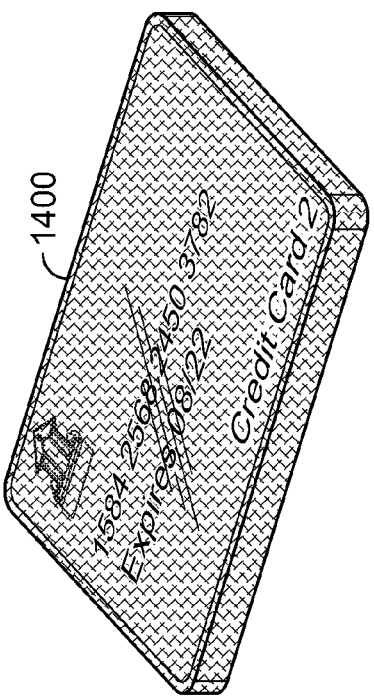
Figure 14A:
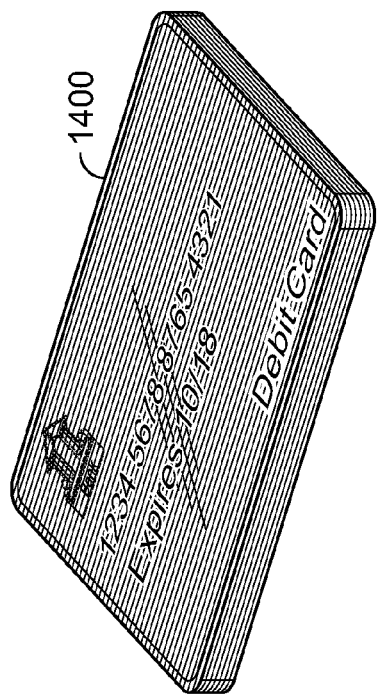
Figure 14C:
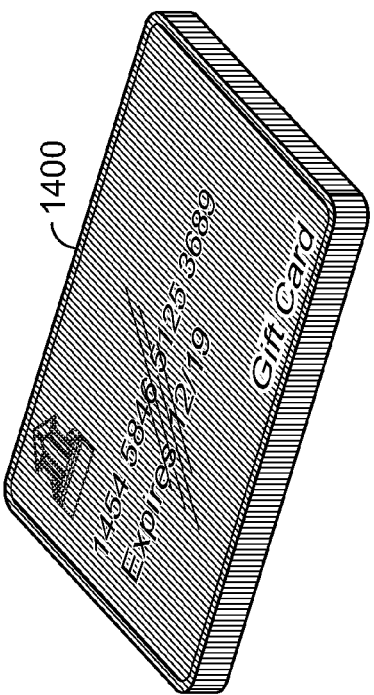

FIG. 14B shows illustrative dimensions that may be associated with smart card 1400. FIG. 14B shows that smart card 1400 may have a length of 85.60 mm. FIG. 14B shows that smart card 1400 may have a width of 53.98 mm. FIG. 14B shows that smart card 1400 may have a thickness of 0.8 mm.

Figure 15:
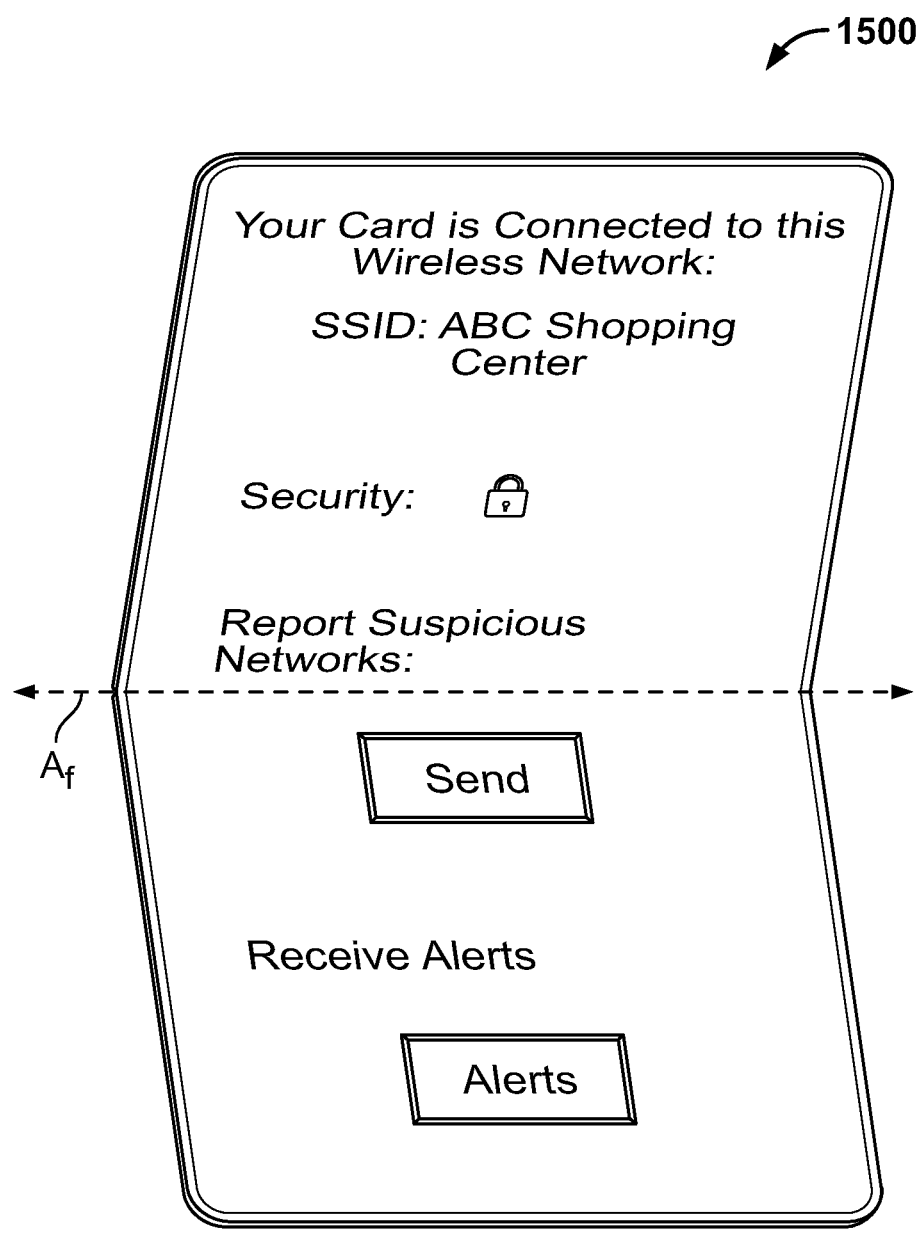
FIG. 15 shows illustrative apparatus and an illustrative scenario in accordance with principles of the invention.

FIG. 15 shows illustrative smart card 1500. Smart card 1500 may include an OLED display. FIG. 15 shows illustrative information that may be presented using the OLED display. FIG. 15 also shows that smart card 1500 and its OLED display may be foldable about axis $A_f$. Smart card 1500 and its OLED display may also be rollable. Smart card 1600, when folded may have a size that is substantially 85.60 mm×53.98 mm×0.8 mm.

Thus, methods and apparatus for OLED universal plastic have been provided. Persons skilled in the art will appreciate that the present invention can be practiced by other than the described embodiments, which are presented for purposes of illustration rather than of limitation. The present invention is limited only by the claims that follow.

What is claimed is:

1. A smart card comprising:
a first array of organic light emitting diodes ("OLEDs") forming an OLED display, the array of OLEDs having a thickness that is not greater than 0.25 mm and having a surface area that is at least 90% of 85.60 mm×53.98 mm;
a second array of OLEDs forming a second OLED display, the second array of OLEDs having a surface area that is at least 90% of 85.60 mm×0.8 mm;
a third array of OLEDs forming a third OLED display, the third array of OLEDs having a surface area that is at least 90% of 85.60 mm×0.8 mm;
a fourth array of OLEDs forming a fourth OLED display, the fourth array of OLEDs having a surface area that is at least 90% of 53.98 mm×0.8 mm;
a fifth array of OLEDs forming a fifth OLED display, the fifth array of OLEDs having a surface area that is at least 90% of 53.98 mm×0.8 mm;

a pressure sensitive button having a thickness that is not greater than 0.8 mm;
a wireless communication circuit having a thickness that is not greater than 0.8 mm;
a processor circuit comprising a non-transitory memory and a processor, the processor circuit having a thickness that is not greater than 0.25 mm; and
a battery for powering the OLED displays, the wireless communication circuit and the processor circuit, the battery having a thickness that is not greater than 0.5 mm;
wherein, in operation, the processor circuit is configured to control the OLED displays and the wireless communication circuit by:
powering the wireless communication circuit using the battery for a first pre-determined time period in response to pressure applied to the pressure sensitive button;
during the first pre-determined time period:
instructing the wireless communication circuit to continuously scan for a wireless communication network;
in response to detecting the wireless communication network, formulating an encrypted request for an alert, the request associated with a destination and an identifier extracted from the non-transitory memory; and
using the wireless communication circuit, transmitting the encrypted request to the destination over the wireless communication network;
after the transmitting, powering the wireless communication circuit using the battery for a second pre-determined time period;
during the second time period, receiving the alert from the destination over the wireless network, the alert comprising instructions formulated by the destination and executable by the processor circuit; and
in response to receiving the alert, executing the instructions and thereby illuminating pixels within the one or more OLED displays as specified in the alert.

2. The smart card of claim 1, wherein the alert comprises executable instructions that, when executed by the processor circuit instruct at least one of the OLED displays to:
change a color of a pre-determined surface area of the at least one OLED display, wherein, the color is determined based on sensitive data stored on the smart card;
flash in a pre-determined authentication sequence; or
present a picture on the pre-determined surface area of the at least one OLED display.

3. The smart card of claim 1, wherein the alert comprises instructions that, when executed by the processor circuit, form one or more letters on a pre-determined surface area of at least one of the OLED displays, wherein, the one or more letters provide rewards information associated with a location of the smart card.

4. The smart card of claim 1, wherein the alert comprises instructions that are formulated based on a geographic location of a node on the wireless communication network that is in direct communication with the wireless communication circuit.

5. The smart card of claim 4 wherein the alert comprises instructions for presenting, on at least one of the OLED displays, a coupon for a product sold within a pre-determined distance of the geographic location.

6. The smart card of claim 1 wherein the alert comprises instructions, that when executed by the processing circuit;
deletes a first instance of sensitive data stored in the non-transitory memory;
replaces the first instance of sensitive data with a second instance of sensitive data; and
presents the second instance of sensitive data on at least one of the OLED displays.

7. The smart card of claim 1, wherein the alert comprises executable instructions that when executed by the processor circuit in response to a request to authorize a transfer of sensitive data stored in the non-transitory memory:
instructs at least one of the OLED displays to blink in a predetermined sequence, and
deletes all sensitive data stored on the smart card.

8. The smart card of claim 1 further comprising:
a substrate layer that supports each of the OLED displays;
a circuitry layer that controls illumination of one or more pixels within each OLED display; and
a barrier layer that keeps contaminants out of each OLED display;
wherein a total thickness of the substrate layer, each OLED display, the circuitry layer and the barrier layer is not greater than 0.5 mm.

9. The smart card of claim 1 wherein the non-transitory memory stores multiple instances of sensitive data, and the processor circuit, in operation, is configured to:
present, using at least one of the OLED displays, graphical representations corresponding to each of the multiple instances of sensitive data;
receive a touch selection of at least one of the graphical representations; and
instruct the wireless communication circuit to transmit over the wireless network to the node, each instance of sensitive data corresponding to the selection.

10. The smart card of claim 1, wherein one or more pixels within at least one of the OLED displays are illuminated by power supplied by the battery for a third pre-determined time period.

11. The smart card of claim 1 wherein at least one of the OLED displays, the processor circuit, the pressure sensitive button, the battery and the wireless communication circuit are arranged such that a total size of the smart card is less than or equal to 85.60 mm×53.98 mm×0.8 mm.

12. A smart card that is not greater than 86 mm×54 mm×0.8 mm and comprising:
a first organic light emitting diode ("OLED") display comprising one or more pixels, the first OLED display having a thickness that is not greater than 0.25 mm and having a surface area that is at least 90% of 85.60×53.98 mm;
a second OLED display comprising one or more pixels, the second OLED display having a thickness that is not greater than 0.25 mm and having a surface area that is at least 90% of 85.60×53.98 mm;
a third OLED display comprising one or more pixels, the third OLED display having a surface area that is at least 90% of 85.60 mm×0.8 mm;
a fourth OLED display comprising one or more pixels, the fourth OLED display having a surface area that is at least 90% of 85.60 mm×0.8 mm;
a fifth OLED display comprising one or more pixels, the fifth OLED display having a surface area that is at least 90% of 53.98 mm×0.8 mm;
a sixth OLED display comprising one or more pixels, the sixth OLED display having a surface area that is at least 90% of 5198 mm×0.8 mm;
a wireless communication circuit having a thickness that is not greater than 0.8 mm;

a processor circuit comprising a non-transitory memory and a processor, the processor circuit having a thickness that is not greater than 0.25 mm; and a battery for powering the first, second, third, fourth, fifth or sixth OLED displays, the wireless communication circuit and the processor circuit, the battery having a thickness that is not greater than 0.5 mm;

wherein, the processor circuit is configured to control illumination of the first, second, third, fourth, fifth or sixth OLED displays in response to instructions executable by the processor circuit received via the wireless communication circuit.

13. The smart card of claim 12 wherein the processor circuit is configured to control illumination of the one or more pixels in at least one of the OLED displays independently of illumination of the one or more pixels in any other of the OLED displays.

14. The smart card of claim 12 wherein the processor circuit is configured to control illumination of the one or more pixels in the first OLED display and the one or more pixels in the second OLED display such that information displayed on the first and second OLED displays is identical.

15. The smart card of claim 12 wherein:
the first OLED display is visible on a front face of the smart card;
the second OLED display is visible on a back face of the smart card; and
the processor circuit controls illumination of the one or more pixels in the first OLED display and the one or more pixels in the second OLED display such that information displayed on the first and second OLED display is contiguous when the smart card is flipped from the front-face to the back-face.

16. The smart card of claim 12 wherein:
the third and fourth OLED displays are positioned substantially parallel to each other; and
the fifth and sixth OLED displays are positioned substantially parallel to each other.

17. The smart card of claim 16 wherein the processor circuit is configured to illuminate at least one of the third, fourth, fifth or sixth OLED displays and present a predetermined color when the wireless communication circuit detects that the smart card is within range of a wireless communication network.

18. The smart card of claim 17 wherein when the predetermined color is a first color, the processor circuit is configured to illuminate at least one of the third, fourth, fifth or sixth OLED displays and present a second color when the processor circuit detects that the smart card is transmitting sensitive data stored in the non-transitory memory.

19. A smart card comprising:
a first organic light emitting diode ("OLED") display forming one or more pixels, the OLED display having a thickness that is not greater than 0.25 mm and having a surface area that is at least 90% of 85.60 mm×53.98 mm;

a wireless communication circuit having a thickness that is not greater than 0.8 mm;

a processing circuit comprising a non-transitory memory and a processor, the processing circuit having a thickness that is not greater than 0.25 mm and the non-transitory memory having a first copy of sensitive data stored thereon;

a battery for powering the first OLED display, the wireless communication circuit and the processing circuit, the battery having a thickness that is not greater than 0.5 mm;

a magnetic stripe having a second copy of the sensitive data stored on the non-transitory memory, the magnetic stripe being readable by a card reader;

a second OLED display forming one or more pixels, the second OLED display having a thickness that is not greater than 0.25 mm and having a surface area that is at least 90% of 85.60 mm×53.98 mm;

a third OLED display comprising one or more pixels, the third OLED display having a surface area that is at least 90% of 85.60 mm×0.8 mm;

a fourth OLED display comprising one or more pixels, the fourth OLED display having a surface area that is at least 90% of 85.60 mm×0.8 mm;

a fifth OLED display comprising one or more pixels, the fifth OLED display having a surface area that is at least 90% of 53.98 mm×0.8 mm; and a sixth OLED display comprising one or more pixels, the sixth OLED display having a surface area that is at least 90% of 53.98 mm×0.8 mm;

wherein:
the processing circuit is configured to draw power from the battery, control illumination of the first, second, third, fourth, fifth and sixth OLED displays and control release of the first copy of the sensitive data via the wireless communication circuit;
when the second copy of the sensitive data stored on the magnetic stripe is being read by the card reader, the card reader charges the battery; and
the first OLED display, the second OLED display, the third OLED display, the fourth OLED display, the fifth OLED display, the sixth OLED display, the processor circuit, the battery, the magnetic stripe and the wireless communication circuit are arranged such that a total thickness of the smart card is less than or equal to 0.8 mm.

20. The smart card of claim 19 wherein, the magnetic stripe is positioned underneath the first OLED display.

* * * * *